(12) United States Patent
Tooher et al.

(10) Patent No.: US 11,457,433 B2
(45) Date of Patent: Sep. 27, 2022

(54) SYSTEMS AND METHODS FOR LTE OPERATION IN UNLICENSED BANDS

(71) Applicant: INTERDIGITAL PATENT HOLDINGS, INC., Wilmington, DE (US)

(72) Inventors: J. Patrick Tooher, Montreal (CA); Janet A. Stern-Berkowitz, Little Neck, NY (US); Pouriya Sadeghi, San Diego, CA (US); Moon-il Lee, Melville, NY (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 333 days.

(21) Appl. No.: 15/565,113

(22) PCT Filed: Apr. 7, 2016

(86) PCT No.: PCT/US2016/026442
§ 371 (c)(1),
(2) Date: Oct. 6, 2017

(87) PCT Pub. No.: WO2016/164584
PCT Pub. Date: Oct. 13, 2016

(65) Prior Publication Data
US 2018/0103458 A1    Apr. 12, 2018

Related U.S. Application Data

(60) Provisional application No. 62/144,910, filed on Apr. 8, 2015.

(51) Int. Cl.
*H04W 72/04* (2009.01)
*H04W 74/08* (2009.01)
(Continued)

(52) U.S. Cl.
CPC ......... *H04W 72/042* (2013.01); *H04W 16/14* (2013.01); *H04W 74/0808* (2013.01); *H04W 72/1215* (2013.01)

(58) Field of Classification Search
CPC ............. H04W 16/14; H04W 74/0808; H04W 72/042; H04W 72/1215; H04W 72/1289
See application file for complete search history.

(56) References Cited

U.S. PATENT DOCUMENTS

| 9,397,865 B2 | 7/2016 | Seo et al. |
| 10,404,389 B2 | 9/2019 | Li et al. |

(Continued)

FOREIGN PATENT DOCUMENTS

| CN | 101212248 B | 5/2011 |
| CN | 104247488 A | 12/2014 |

(Continued)

OTHER PUBLICATIONS

3rd Generation Partnership Project (3GPP), R1-150191, "Frame Structure Design for LAA", Alcatel-Lucent Shanghai Bell, Alcatel-Lucent, 3GPP TSG RAN WG1 Meeting #80, Athens, Greece, Feb. 9-13, 2015, 7 pages.

(Continued)

*Primary Examiner* — Oussama Roudani
(74) *Attorney, Agent, or Firm* — Condo Roccia Koptiw LLP

(57) ABSTRACT

Systems, devices, and methods are disclosed for determining one or more clear channel assessment occasions. Techniques include performing one or more clear channel assessment (CCA) processes on a channel during the one or more CCA occasions to determine whether the channel is available at the one or more CCA occasion based on the one or more CCA processes. Techniques include sending the UL transmission in one or more UL subframes via the channel on at (Continued)

least a condition that the channel is determined to be available at the one or more CCA occasions. Techniques include performing the one or more CCA processes on the channel during another of the one or more CCA occasions on at least a condition that the channel is determined to be unavailable at a previous CCA occasion.

14 Claims, 14 Drawing Sheets

(51) Int. Cl.
*H04W 16/14* (2009.01)
*H04W 72/12* (2009.01)

(56) References Cited

U.S. PATENT DOCUMENTS

| | | | |
|---|---|---|---|
| 2006/0133304 | A1 | 6/2006 | Tanach |
| 2011/0249627 | A1 | 10/2011 | Stanwood et al. |
| 2013/0039297 | A1* | 2/2013 | Wang .............. H04W 76/25 370/329 |
| 2013/0195041 | A1 | 8/2013 | Papasakellariou et al. |
| 2014/0254452 | A1 | 9/2014 | Golitschek et al. |
| 2014/0341207 | A1 | 11/2014 | Bhushan et al. |
| 2014/0362780 | A1 | 12/2014 | Malladi et al. |
| 2015/0071060 | A1* | 3/2015 | Bhushan .............. H04W 36/22 370/230 |
| 2015/0085797 | A1 | 3/2015 | Ji et al. |
| 2015/0223075 | A1 | 8/2015 | Bashar et al. |
| 2015/0296516 | A1 | 10/2015 | Jung |
| 2015/0349931 | A1* | 12/2015 | Damnjanovic .......... H04J 11/00 370/280 |
| 2016/0007350 | A1 | 1/2016 | Xiong et al. |
| 2016/0135181 | A1* | 5/2016 | Nogami ............... H04W 24/08 370/329 |
| 2016/0143014 | A1* | 5/2016 | Mukherjee ........... H04L 5/0039 370/330 |
| 2016/0192396 | A1* | 6/2016 | Ng .................... H04W 74/0808 370/329 |
| 2016/0344521 | A1 | 11/2016 | Liang et al. |
| 2017/0230986 | A1* | 8/2017 | Moon .................. H04W 74/08 |
| 2018/0139775 | A1* | 5/2018 | Ahn .................. H04W 74/0808 |
| 2018/0270815 | A1 | 9/2018 | Bala et al. |
| 2018/0317246 | A1* | 11/2018 | Mukherjee ........ H04W 74/0816 |

FOREIGN PATENT DOCUMENTS

| | | |
|---|---|---|
| CN | 104486013 A | 4/2015 |
| KR | 10-2014-0119112 A | 10/2014 |
| KR | 10-2014-0134213 A | 11/2014 |
| WO | 2012/095038 A1 | 7/2012 |
| WO | 2014/189915 A3 | 3/2015 |

OTHER PUBLICATIONS

3rd Generation Partnership Project (3GPP), R1-150368, "Discussion on UL Transmission for LAA", Samsung, 3GPP TSG RAN WG1 #80, Athens, Greece, Feb. 9-13, 2015, pp. 1-7.
3rd Generation Partnership Project (3GPP), R1-150487, "On LBT and Frame Structure Design", Nokia Networks, Nokia Corporation, 3GPP TSG RAN WG1 Meeting #80, Athens, Greece, Feb. 9-13, 2015, 5 pages.
3rd Generation Partnership Project (3GPP), R1-150490, "Frame Structure Design for LAA with LBT", ITL Inc., 3GPP TSG RAN WG1 Meeting #80, Athens, Greece, Feb. 9-13, 2015, 6 pages.
3rd Generation Partnership Project (3GPP), TS 36.211 V12.1.0, "Technical Specification Group Radio Access Network, Evolved Universal Terrestrial Radio Access (E-UTRA), Physical Channels and Modulation (Release 12)", Mar. 2014, pp. 1-120.
3rd Generation Partnership Project (3GPP), TS 36.212 V12.0.0, "Technical Specification Group Radio Access Network, Evolved Universal Terrestrial Radio Access (E-UTRA), Multiplexing and Channel Coding (Release 12)", Dec. 2013, pp. 1-88.
3rd Generation Partnership Project (3GPP), TS 36.213 V12.1.0, "Technical Specification Group Radio Access Network, Evolved Universal Terrestrial Radio Access (E-UTRA), Physical Layer Procedures (Release 12)", Mar. 2014, pp. 1-186.
3rd Generation Partnership Project (3GPP), TS 36.321 V12.4.0, "Technical Specification Group Radio Access Network, Evolved Universal Terrestrial Radio Access (E-UTRA), Medium Access Control (MAC) Protocol Specification (Release 12)", Dec. 2014, pp. 1-60.
3rd Generation Partnership Project (3GPP), TS 36.322 V12.1.1, "Technical Specification Group Radio Access Network, Evolved Universal Terrestrial Radio Access (E-UTRA), Radio Link Control (RLC) Protocol Specification (Release 12)", Dec. 2014, pp. 1-40.
3rd Generation Partnership Project (3GPP), TS 36.331 V12.4.1, "Technical Specification Group Radio Access Network, Evolved Universal Terrestrial Radio Access (E-UTRA), Radio Resource Control (RRC), Protocol Specification (Release 12)", Dec. 2014, pp. 1-410.
European Telecommunications Standards Institute (ETSI), EN 301 893 V1.7.1, "Broadband Radio Access Networks (BRAN), 5 GHz High Performance RLAN, Harmonized EN Covering the Essential Requirements of Article 3.2 of the R&TTE Directive", Jun. 2012, pp. 1-90.
3rd Generation Partnership Project (3GPP), R1-151056, "UL LAA Design", Kyocera, 3GPP TSG RAN WG1 Ad-Hoc Meeting, Paris, France, Mar. 24-26, 2015, 4 pages.

\* cited by examiner

SYSTEMS AND METHODS FOR LTE OPERATION IN UNLICENSED BANDS

CROSS-REFERENCE TO RELATED APPLICATIONS

This application is the National Stage Entry under 35 U.S.C. § 371 of Patent Cooperation Treaty Application No. PCT/US2016/026442, filed Apr. 7, 2016, which claims the benefit of U.S. Provisional Patent Application No. 62/144,910, filed on Apr. 8, 2015, the contents of all of which being hereby incorporated by reference as if fully set-forth herein in their respective entirety, for all purposes.

BACKGROUND

Conventional cellular systems, such as long term evolution (LTE) cellular systems, may use licensed spectrum that is limited to spectrum acquired by the respective operator of an LTE system, for example via a government auction. In such systems, the operator may have exclusive rights to use a spectrum for providing, for example, services to user devices, without concern for in-band interference from systems operated by other operators.

In some such systems, unlicensed spectrum may also be used by such operators to augment their service offerings to meet an increasingly high demand for, e.g., broadband data. In such systems, LTE operation in such unlicensed spectrum may coexist with other technologies using unlicensed spectrum, such as Wi-Fi. In some such systems, operators may make efforts to minimize interference and/or provide for fair access among the users of the unlicensed spectrum.

SUMMARY

The Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Systems, device, and methods are disclosed for determining a clear channel assessment occasion from among a plurality of clear channel assessments and/or performing a clear channel assessment on a channel during the clear channel assessment occasion to determine whether the clear channel assessment indicates that the channel is available.

One or more techniques may be performed by a wireless transmit/receive unit (WTRU). Techniques may include receiving an uplink (UL) grant for an UL transmission. The UL grant may indicate at least one of: one or more UL subframes, or one or more UL resources. Techniques may include determining one or more Clear Channel Assessment (CCA) occasions based on at least one of: the UL grant, a first Fixed Frame Period (FFP) of one or more FFPs, or a first UL block of one or more UL blocks on condition that at least one of: the first FFP, or the first UL block includes at least one of: a partial subframe or a full subframe of the one or more UL subframes. Techniques may include determining the one or more Clear Channel Assessment (CCA) occasions based on the UL grant on condition that neither of: the first FFP or the first UL block includes the at least one of: the partial subframe or the full subframe of the one or more UL subframes.

Techniques may include performing one or more CCA processes on a channel during a first CCA occasion of the one or more CCA occasions. Techniques may include determining whether the channel is at least one of: available or unavailable at the first CCA occasion based on the one or more CCA processes. Techniques may include sending the UL transmission in the one or more UL subframes via the channel on at least a condition that the channel is determined to be available at the first CCA occasion. Techniques may include performing the one or more CCA processes on the channel during a second CCA occasion on at least a condition that the channel is determined to be unavailable at the first CCA occasion.

BRIEF DESCRIPTION OF THE DRAWINGS

The following detailed description of example embodiments is provided with reference to the appended drawings. For the purposes of illustration, the drawings show example embodiments. The contemplated subject matter is not limited to the specific elements and/or instrumentalities described or illustrated. Absent specific notation to the contrary, no subject matter is contemplated as necessary and/or essential. In addition, the described embodiments may be employed in any combination, in whole or in part. In the drawings.

DETAILED DESCRIPTION

A detailed description of example embodiments will now be described with reference to the various figures. Although this description provides a detailed example of possible implementations, it should be noted that the details are intended to be examples and in no way limit the scope of the application. As used herein, the article "a" or "an," absent further qualification or characterization, may be understood to mean "one or more" or "at least one," for example. Also, as used herein, the phrase "user equipment" (UE) may be understood to mean the same thing as the phrase "wireless transmit/receive unit" (WTRU).

Figure 1A:
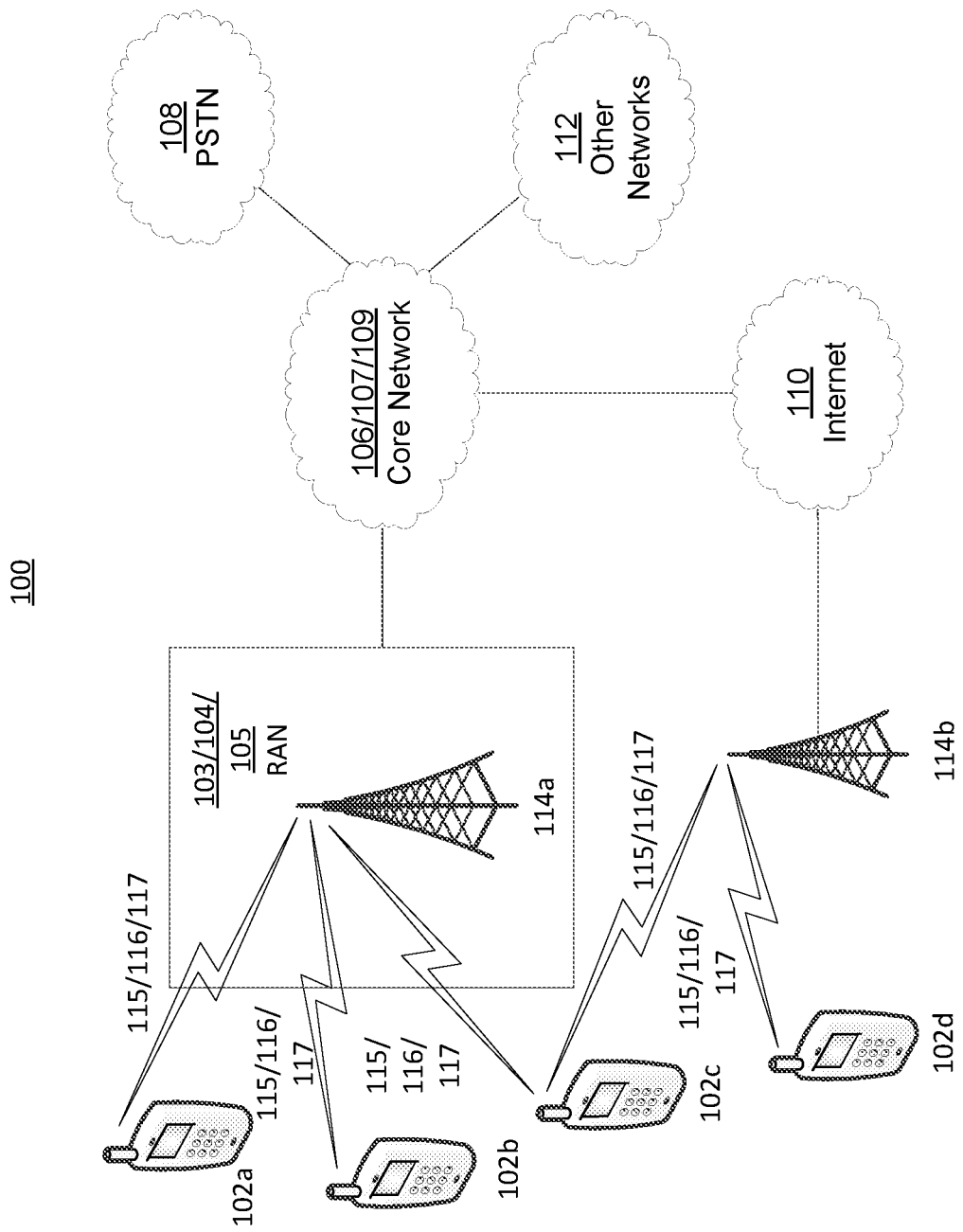
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (that generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
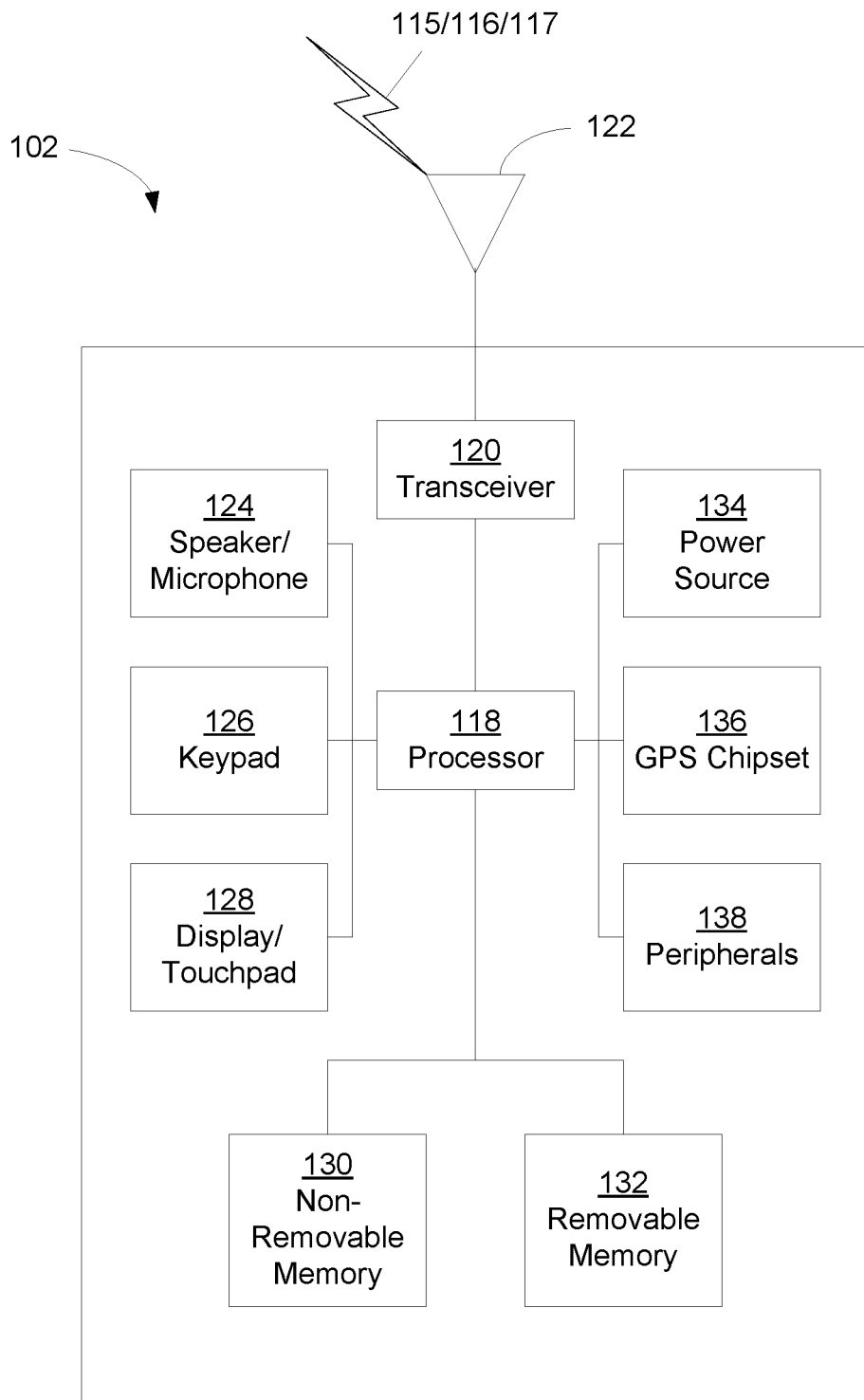
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
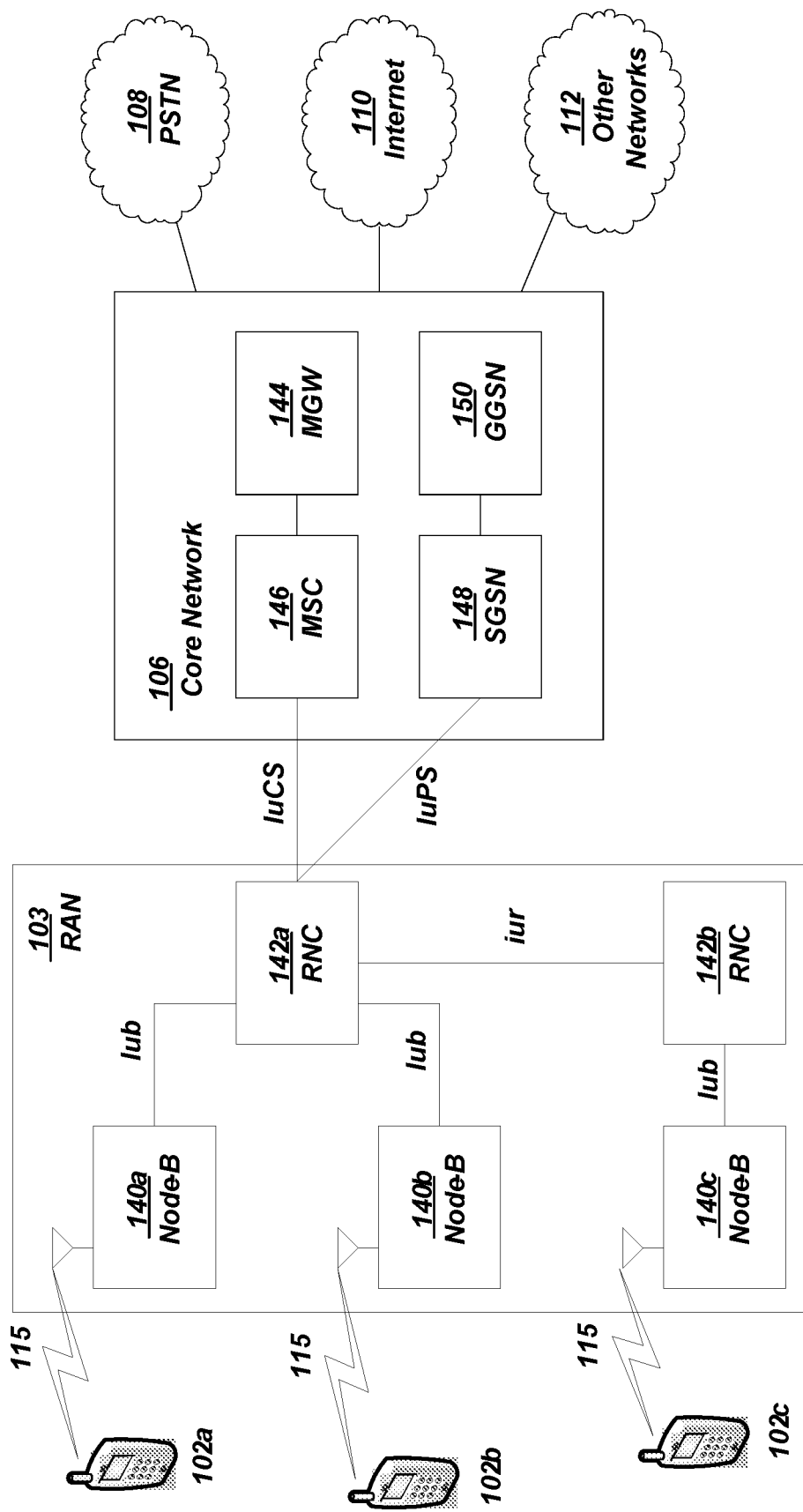
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
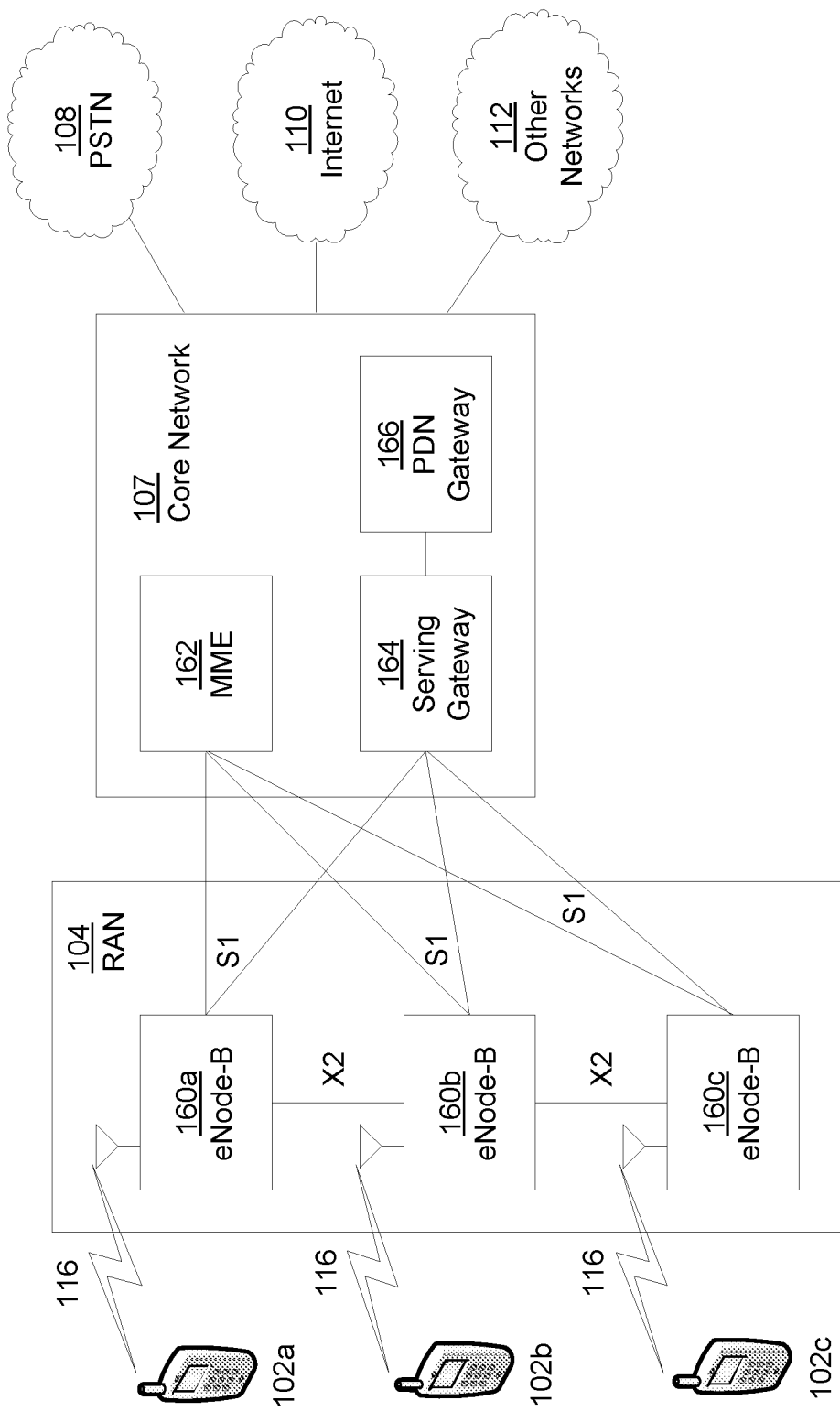
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
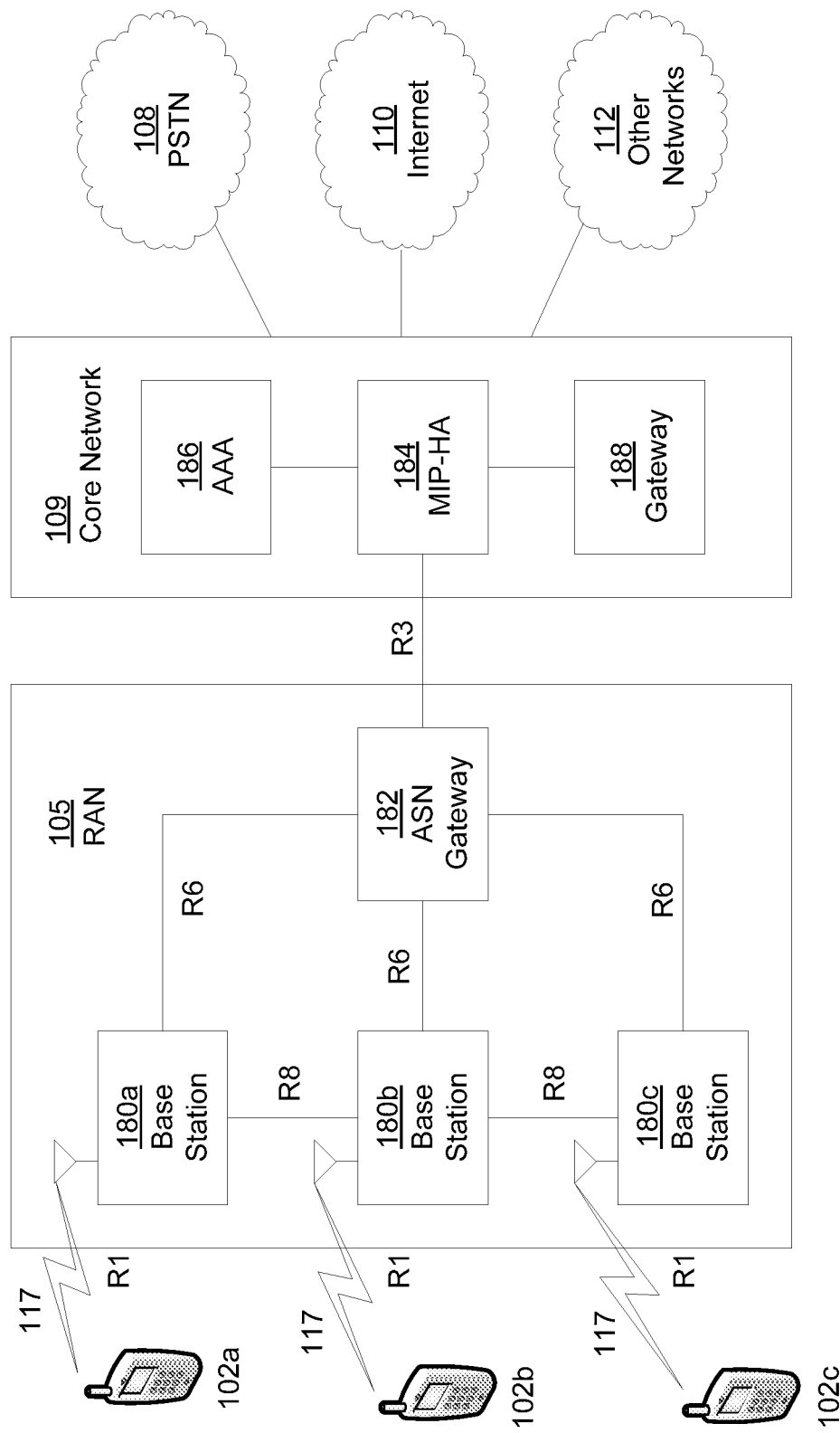
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point that may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In LTE time division duplexing (TDD), multiple TDD uplink-downlink subframe configurations may be supported. At least one of such configurations may be used in an eNodeB of any type. Each TDD uplink-downlink subframe configuration may contain one or more downlink subframes, denoted herein as 'D', one or more uplink subframes, denoted herein as 'U', and/or one or more special subframes, denoted herein as 'S'. Special subframes may include a downlink (DL) part, an uplink (UL) part, and/or a guard period between such parts that may allow for time that may be used for a transition from DL to UL. Example uplink-downlink subframe configurations are shown below in Table 1. The phrases "uplink-downlink subframe configuration" and "uplink-downlink configuration" may be used interchangeably in the instant disclosure.

TABLE 1

Example TDD LTE uplink-downlink configurations

| Uplink-downlink configuration | Downlink-to-Uplink Switch-point periodicity | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Cellular systems, such as LTE systems, may use licensed spectrum. Operators may acquire, for example via an auction held by a government, the right to utilize a certain part of a frequency band in a certain geographic area for use in the transmission and/or reception of cellular signals. By using licensed spectrum, an operator may have exclusive use of that spectrum to provide services to its users without accommodating in-band interference from systems of other operators.

Unlicensed spectrum that may have traditionally been used for non-cellular services and applications (e.g., IEEE 802.11 technologies (i.e., Wi-Fi)) may be considered for use by cellular operators as a complementary technology to augment service offerings to meet an increasing demand for broadband data services. One or more deployment scenarios utilizing various types of spectrum may employ carrier aggregation. In one or more scenarios, which may be referred to herein as "Licensed-Assisted Access" (LAA), a primary component carrier and/or serving cell (that may be referred to herein as a "PCell") may be a licensed carrier (e.g., a carrier that may use licensed spectrum). An unlicensed carrier (e.g., a carrier that may use unlicensed spectrum) may be a secondary component carrier and/or serving cell (that may be referred to herein as an "SCell") that may be aggregated with a PCell. There may be any number of unlicensed SCells and/or any number of licensed SCells (including zero, for both types of carriers/cells) that may be aggregated together and/or with one or more PCells. In scenarios employing carrier aggregation, one or more PCells and/or SCells may belong to a same eNodeB. Dual connectivity may be employed, perhaps for example where one or more unlicensed carriers may belong to a different eNodeB than a licensed PCell. In dual connectivity scenarios for example, a primary secondary cell (PSCell) may be a licensed cell and/or an unlicensed cell.

In scenarios that conduct LTE operations in unlicensed spectrum, coexistence of LTE with other unlicensed technologies (such as Wi-Fi), and/or coexistence with other LTE operators, may be considered in an attempt to minimize interference and/or provide for fairness among users of such unlicensed spectrum. Various mechanisms, such as Listen-Before-Talk (LBT) and/or transmission gaps, are contemplated herein. In LBT scenarios, a system node, such as an Access Point (AP), an eNodeB, a WTRU, and/or the like, may listen to a channel (e.g., a frequency band that may have a defined center frequency and/or bandwidth) to determine whether there may be another node using the channel before transmitting on the channel or a portion of the channel. Listening and/or determination of usage by another node may include, and/or may be based at least in part, on measurements that may include energy detection. Transmission gaps may be used by a system node such that the node may transmit on a channel and/or a part of a channel and/or may include gaps in such a transmission that allow other potential users to see the channel as free and/or to use the channel.

LTE operation in unlicensed spectrum, regardless of whether such operation is combined with operation in licensed spectrum (e.g., operation with or without aggregation and/or dual connectivity with a licensed PCell and/or PSCell), may be referred to herein as LTE-unlicensed operation (LTE-U). Also as used herein, the term "channel" may represent part of a channel and/or an entire channel. Note also that the terms "Wi-Fi," "WiFi," and "Wifi" may be used interchangeably. In the description set forth herein, LTE-U may be substituted for LAA, and/or vice versa, and/or may be consistent with the techniques described herein.

A potential transmitter on a channel, such as a WTRU with a potential UL transmission and/or an eNodeB with a potential DL transmission, may evaluate and/or monitor (e.g., receive) a channel to, for example, measure and/or determine a signal presence and/or interference on the channel prior to transmission. For example, the potential transmitter may observe the channel to determine whether the channel may be in use (e.g., busy and/or occupied) by another system, user, and/or signal. This channel evaluation and/or monitoring may be referred to as Listen-Before-Talk (LBT), Clear Channel Assessment (CCA), and/or LBT/CCA herein. Herein, LBT, CCA, and LBT/CCA may be used interchangeably.

A potential transmitter may compare a received signal and/or interference from the channel to a criteria, such as one or more threshold levels, and/or may determine, based on such a comparison, whether the channel may be free. Perhaps for example if the potential transmitter determines the channel may be free, the potential transmitter may transmit on the channel. Perhaps for example if the potential transmitter determines the channel might not be free, the potential transmitter might not transmit on the channel and/or may defer the potential transmission and/or discard the potential transmission.

As used herein, "frame-based equipment" (FBE) may refer to equipment for which transmit and/or receive timing may be fixed and/or structured. For example, in some scenarios, the European Telecommunications Standards Institute (ETSI) may provide European regulatory rules that may be related to LBT/CCA with which some FBE may comply.

As used herein, "equipment" may refer to any node or device, such as a WTRU, an eNodeB, a STA, and/or an AP, any of which may transmit and/or receive on a licensed and/or an unlicensed channel.

Figure 2:
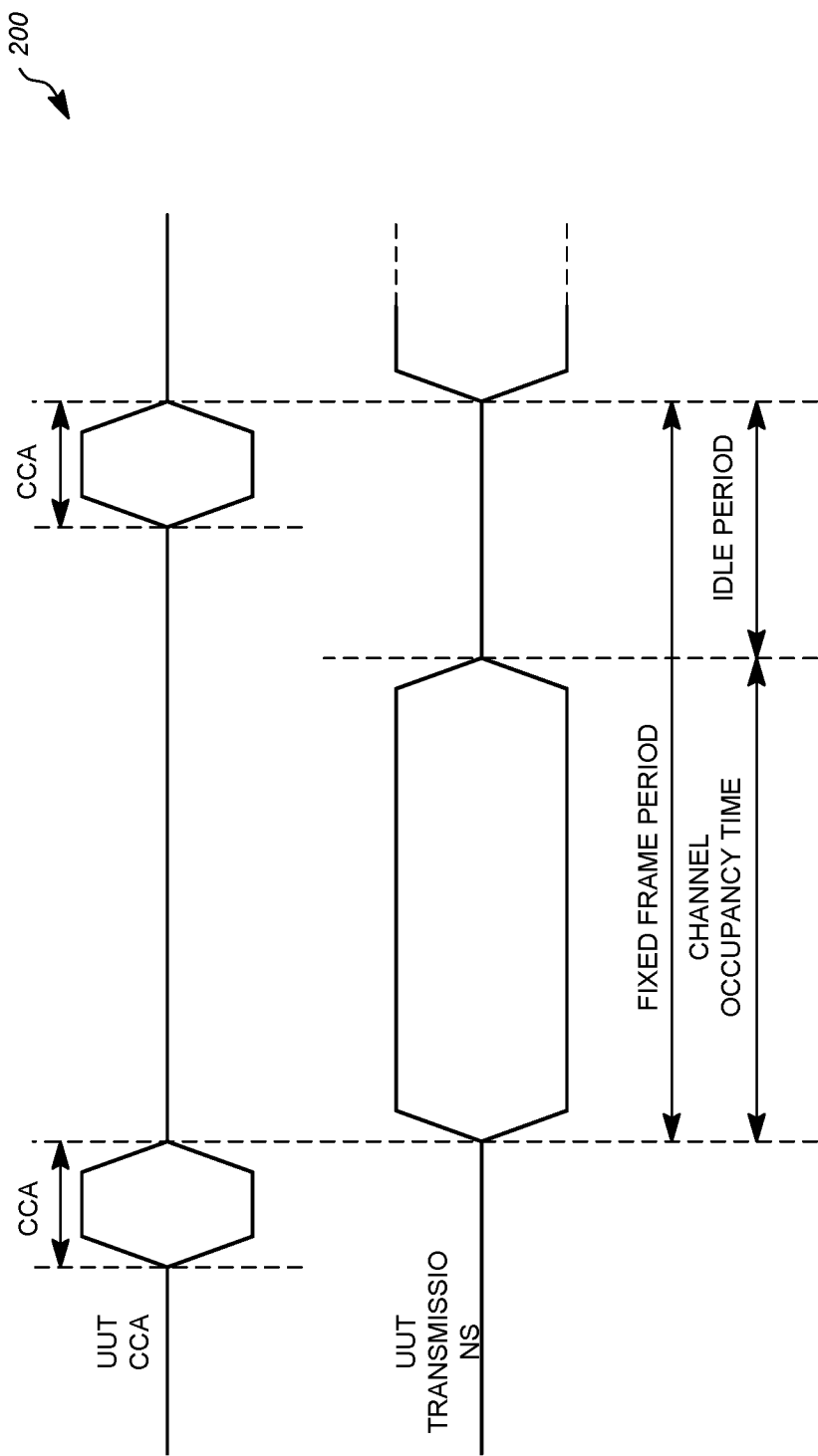
FIG. 2 is a graph illustrating example listen-before-talk and/or clear channel assessment timing that may be used in frame-based equipment embodiments.

FIG. 2 provides example timing graph 200 illustrating an example LBT/CCA timing schedule that may apply to FBE. In LBT/CCA and/or scenarios utilizing equipment such as FBE, a LBT/CCA may be performed periodically, e.g., at one or more predefined time instances that may be determined according to a predetermined frame structure. LBT/CCA periodicity (e.g., a fixed frame period) may be equal to a channel occupancy time plus an idle period. The LBT/CCA time period for channel evaluation may be a fixed time and/or may a have a minimum time. Channel occupancy time may be a total time during which equipment may have one or more transmissions on a particular channel without reevaluating the availability of that channel. An idle period may be the time, e.g., a consecutive period of time, during which the equipment might not transmit on a channel. A channel occupancy time may have an allowed range, such as, but not limited to, one ms to ten ms, for example. An idle period may have a minimum that may be determined with respect to a channel occupancy time. For example, five percent of a channel occupancy time may be used by the equipment to determine a current fixed frame period.

In scenarios such as if equipment finds, for example, during and/or as a result of LBT/CCA, that an operating channel and/or channels are clear, such equipment may transmit immediately on such clear channel and/or channels. Perhaps for example if such equipment finds, during and/or as a result of LBT/CCA, that an operating channel is occupied, such equipment might not transmit on that operating channel, maybe for a timeframe such as a next fixed frame period.

As used herein, "clear", "free", "not occupied," and "not busy" may be terms that may be used interchangeably.

Likewise, "not clear," "not free," "occupied," and/or "busy" be terms that may also be used interchangeably. "Channel" and "operating channel" may also be used interchangeably herein.

Load-based equipment (LBE) might not perform an LBT/CCA determination, for example, based on a certain frame structure, e.g., at fixed and/or defined times. LBE may perform an LBT/CCA determination when such an LBE has data to transmit. For example, the standards organization ETSI may provide European regulatory rules that may be related to LBT/CCA. LBE may perform an LBT/CCA determination based on such rules.

In scenarios that check and/or determine LBT/CCA, such as for example where equipment such as one or more LBEs are used, various rules and/or conditions may be used, individually or in any combination with any techniques set forth herein. For example, before a transmission and/or a burst of transmissions are sent on an operating channel, the transmitting equipment may perform a LBT/CCA check that may detect energy on the channel. Perhaps for example if the equipment finds, for example during and/or as a result of a LBT/CCA check, that an operating channel and/or channels appears to be clear, such equipment may transmit (e.g., immediately) on the channel and/or channels determined to be clear.

Maximum channel occupancy time may be the total time that equipment may make use of an operating channel for a given transmission and/or burst of transmissions. Maximum channel occupancy time for particular equipment may be less than a maximum allowed value that may be set by the manufacturer of the equipment. The maximum allowed value set by a manufacturer of a piece of particular equipment may be 13/32×q ms, where q may be set by the manufacturer as a value between 4 and 32. In some scenarios, q may equal 32 (i.e., q=32). The maximum channel occupancy may be 13 ms.

Perhaps if equipment finds, for example during and/or as a result of an LBT/CCA determination, that an operating channel is occupied, such equipment might not transmit in the evaluated operating channel, perhaps for example until it performs a subsequent LBT/CCA that may find the channel clear. A wait time and/or a backoff time may be allowed to expire before a second LBT/CCA determination may be performed on a channel perhaps for example after a first LBT/CCA determination may have found the channel not clear. An LBT/CCA determination may be performed for a channel perhaps for example after determining that the channel is not clear, perhaps for example after a longer time period.

A WTRU may perform an LBT/CCA determination prior to one or more UL transmissions on a serving cell in an unlicensed band. For example, such a WTRU may perform an LBT/CCA determination during an UL LBT/CCA period and/or time window prior to some or all UL transmissions. The length of the LBT/CCA period may be configured by an eNodeB with a specific value (e.g., 10 µs, 20 µs, 40 µs, 60 µs) and/or dynamically signaled to a WTRU. The length of a LBT/CCA period may be determined by a WTRU, e.g., autonomously, for example, according to a rule.

A UL LBT/CCA period may be located at the beginning of a current UL subframe, such as in the first SC-FDMA symbol of such a UL subframe. A UL LBT/CCA period may be located at an end of a subframe, for example, before a current UL subframe, that may be a UL, DL, and/or a special subframe (e.g., a last SC-FDMA symbol and/or an OFDM symbol of a subframe).

Subframe- and/or block-based LBT/CCA determinations may be utilized. For example, a WTRU may have and/or use a single UL LBT/CCA opportunity for a group of consecutive UL subframes (e.g., a UL block). Perhaps for example if a UL LBT/CCA determination during such a LBT/CCA opportunity fails (e.g., if the WTRU finds the channel to be busy), such a WTRU might not transmit in the UL in any of the UL subframes within that UL block. Perhaps for example if the WTRU may find the channel to be free, the WTRU may transmit in the UL subframes within that UL block.

A WTRU may have and/or use a UL LBT/CCA opportunity for an LBT/CCA determination for a UL subframe. Perhaps for example if such a UL LBT/CCA fails (e.g., if the WTRU may find the channel to be busy), the WTRU might not transmit in the UL in the corresponding UL subframe. Perhaps for example if the WTRU may find the channel to be free, the WTRU may transmit in the corresponding UL subframe. The failure of an LBT/CCA determination at a specific UL LBT/CCA opportunity (e.g., the channel being busy) might not impact the UL transmission in one or more other UL subframes.

Operators, and/or associated devices such as eNodeBs, may configure LAA cells with different parameters to enable channel access for UL and/or DL. Such operators and/or devices might not coordinate with other operators and/or devices regarding parameters that such operators and/or devices may configure for their respective LAA cells that may compete with other cells for a same channel. In some implementations, configuration parameters of various competing LAA cells may result in an unfair advantage in accessing a channel for a cell and/or a cell's WTRUs. For example, different LAA cells may have specific CCA opportunities within a frame. A first such LAA cell's opportunities may occur before (e.g., slightly before) that and/or those of a second LAA cell's opportunities, and/or may block some or all channel accessing opportunities for the second LAA cell and/or its WTRUs. Lack of frame and/or subframe alignment between two or more such LAA cells may result such a blocking effect.

LAA channel access may be obtained using a fixed frame period (FFP). Such an FFP may enable a first set of subframes, such as the first n subframes of an FFP, to be used for UL transmissions. The remaining subframes may be used for DL transmissions. This may provide flexibility since one or more, or each frame may have its own, or a distinct, ratio of UL to DL subframes. Such ratios may be achieved by the eNodeB scheduling a desired number of subframes for UL and/or DL. For UL transmissions, a WTRU may (and/or may be configured to) attempt to access a channel at the beginning of an FFP (in some scenarios, perhaps only at the beginning of an FFP).

For example, a WTRU scheduled for UL transmissions for an upcoming FFP may access (e.g., receive) a channel in one or more symbols before the beginning of such an FFP to, for example, determine whether the channel is free. A WTRU scheduled for UL transmissions for an upcoming FFP may be configured to access (e.g., receive) a channel in one or more symbols before the beginning of the FFP to determine whether the channel is free.

A subframe that is not used for UL may be accessed and/or used by an LAA cell (e.g., for DL transmission) if a CCA determination is successful. Accessing a channel may include transmission and/or reception on the channel. Using an FFP, blocking may occur perhaps for example if an FFP of one cell begins (e.g., consistently begins) before an FFP of a second cell. Various techniques that may help avoid and/or mitigate such a blocking problem (e.g., when such a blocking problem arises from the use of an FFP) are described herein.

An eNodeB may belong to (e.g., be controlled by) an operator. A cell may belong to (e.g., be controlled by) an eNodeB. "Operator" and "eNodeB" may be used interchangeably herein. "ENodeB" and "cell" may also be used interchangeably herein. A cell, e.g., for a WTRU, as used herein may be a primary cell (PCell), a secondary cell (SCell), and/or a primary secondary cell (PSCell).

Figure 3:
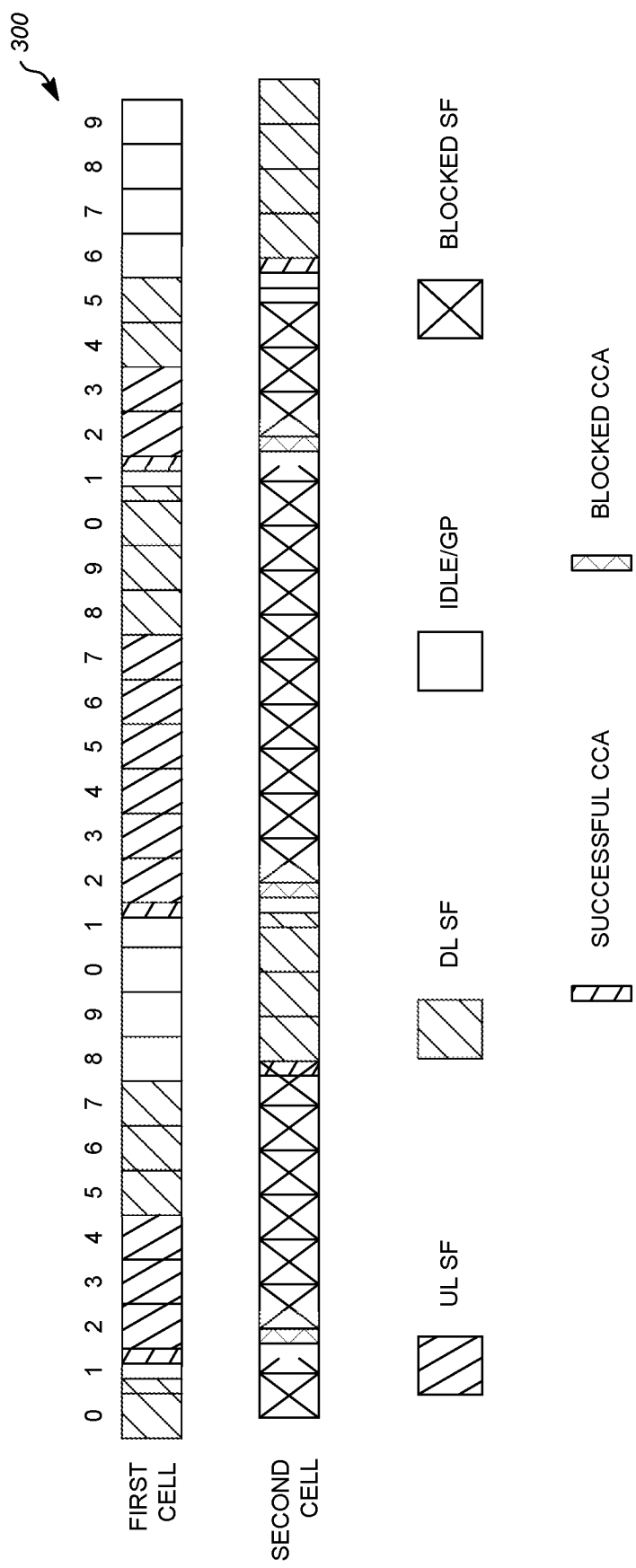
FIG. 3 is a block diagram illustrating an example second cell's uplink transmissions being blocked by an example first cell's transmissions.

FIG. 3 shows an example block diagram 300 of cells demonstrating a scenario where a second cell is being blocked by a first cell. In this non-limiting example, an FFP may start in subframe 2 and/or may have a length of 10 subframes (e.g., 10 ms). Subframe 1 may be a special subframe where DL data may be transmitted in a first portion of the subframe and/or the remaining portion may be idle and/or a guard period (GP) during which the cell might not transmit. The timing of the second cell is such that the start of its FFP (e.g., as seen by a WTRU) is slightly after the start of the first cell's FFP.

In the illustrated example of FIG. 3, a second cell may be competing with a first cell for use of a channel in the UL. Due to a slight time shift, the second cell's WTRUs may systematically determine that a channel is busy during the second cell's WTRUs' CCA period. This may occur because a first cell's WTRUs may determine that the availability of a channel during a CCA occasion occurring prior to that of the second and/or may acquire the channel and/or begin transmitting before the second cell's WTRUs begin CCA.

One or more CCA processes may be performed during one or more, or each, CCA occasion. Any of the one or more CCA processes may include one or more measurements and/or comparisons to thresholds (as described herein) of energy (for example, transmission energy) on the channel and/or adjacent channels. The one or more measurements in one or more, or each, of the CCA processes may occur sequentially or in any other kind of sequence and/or pattern in the one or more CCA occasions.

The example also shows that the second cell may be able to acquire the channel perhaps for example after the first cell completes its UL and/or DL transmissions. In this example, there may be no gap between the UL and/or DL transmissions of the first cell. In some deployments, there may be a gap between UL and/or DL transmissions. This gap may enable the second cell to acquire the channel (for example in subframe 5 of the first frame). This may reduce the effect of blocking, to a degree or completely.

One or more CCA occasions may be configured, provided, and/or used. Such configuration may be provided by an eNodeB to, for example, a WTRU. Either and/or both of a WTRU and/or an eNodeB may use a CCA occasion. Configuration information may be provided by higher layer signaling, such as radio resource control (RRC) signaling and/or broadcast signaling.

A WTRU may receive and/or measure a channel, such as an unlicensed channel, to determine whether the channel may be free and/or available. This determination may be performed prior to transmitting (e.g., in the UL) on the channel.

The term "CCA occasion" as used herein may refer to at least part of a time during which a WTRU may perform CCA. CCA may include receiving and/or measuring a channel to determine the status and/or availability of the channel (e.g., free, busy, available for use by the WTRU, etc.). A channel may be available for use by the WTRU perhaps for example if it is not used at all, perhaps for example if it is used at a level below a threshold (e.g., as measured by the WTRU), and/or perhaps for example if it is used by a WTRU and/or other user with which the WTRU may share the channel (e.g., without causing unacceptable interference to either user of the channel). A channel may be available for use by the WTRU perhaps for example if a measurement of the channel (e.g., energy detect) made by the WTRU is below a threshold. Such a measurement may, for example, be a measurement of the interference in the channel.

Perhaps for example if a WTRU determines a channel to be unavailable based on performing CCA, for example during a CCA occasion, the WTRU may consider the CCA to have failed. A CCA fail and/or failure may be used to represent the outcome of a CCA process (performed, e.g., by a WTRU and/or an eNodeB) that may determine a channel to be unavailable. A CCA succeed and/or success may be used to represent the outcome of a CCA process (performed, e.g., by a WTRU and/or an eNodeB) that may determine a channel to be available. "Blocked" and "failed" (e.g., "blocked CCA" and "failed CCA") may be used interchangeably herein.

A WTRU may be configured with and/or use one or more CCA occasions. A WTRU may be configured with one or more parameters associated with a CCA occasion, where the WTRU may use such parameters to determine at least one of a start time and/or an end time of a CCA occasion. A CCA occasion may be a time period and/or window.

A WTRU may determine one or more CCA occasions as a function of a UL grant (e.g., a time, a subframe, and/or a set of subframes for which a WTRU received a grant for UL transmission). A WTRU may determine one or more CCA occasions as a function of an FFP and/or part of an FFP, such as a start of an FFP and/or a start of a first and/or other UL subframe in an FFP. A WTRU may determine one or more CCA occasions as a function of an FFP, the start of an FFP, and/or the start of a block of one or more (e.g., consecutive) UL subframes where the FFP and/or block of subframes may include a subframe for which the WTRU received an UL grant. For example, if a WTRU receives a grant in subframe n for UL transmission in subframe n+k that belongs to FFP1, the WTRU may determine one or more CCA occasions based on the time of FFP1 (e.g., the start of the first subframe of FFP1 and/or the start of the first subframe of a block of UL subframes in FFP1 which may or might not be subframe n+k). The UL grant may include a time allocation of a range of the one or more UL subframes and/or a duration of the time allocation.

A grant may allocate resources in time and/or frequency for transmission. A grant may be explicitly provided (e.g., by an eNodeB) using DL control information (DCI) format, for example in physical layer signaling. Resources may be granted and/or allocated implicitly and/or indirectly, for example based on a hybrid automatic repeat request negative acknowledgement (HARQ NACK) that may imply retransmission in a certain time and/or using certain frequency resources. Resources may be granted and/or allocated by semi-persistent scheduling (SPS). Grant and resource allocation may be used interchangeably.

The term "CCA occasion" may be used to represent part and/or all of a time period that may correspond to the CCA occasion. For example, a CCA occasion may correspond to a start of a subframe and/or an FFP (and/or first or other UL subframe of an FFP). The correspondence may indicate that the start and/or end of the CCA occasion may correspond to, and/or be determined based on, the start of the subframe and/or FFP (and/or first or other UL subframe of the FFP) for which the WTRU received the grant. The duration of the CCA occasion may be determined by the WTRU based on one or more other factors. Receiving a grant for an FFP may mean receiving a grant for one of the UL subframes in the FFP.

The terminology "correspond to," "be determined based on," and, "be determined as a function of" may be used interchangeably herein. The terms "tied to" and "correspond to" may also be used interchangeably. The terms, "based on" and "as a function of" may also be used interchangeably.

WTRUs may use different and/or multiple CCA occasions prior to UL transmission, for example to reduce the possibility of a first cell and/or first cell's WTRUs blocking a second cell and/or second cell's WTRUs from using the channel, when the timing of the cells might not be aligned.

One or more CCA occasions may be configured, provided, associated with, and/or used for one or more of a UL grant, an FFP, and/or a UL block. A CCA occasion (e.g., the timing of a CCA occasion) may be configured and/or determined in an absolute manner and/or may be configured and/or determined relative to the beginning of a subframe, FFP, and/or UL block for which a WTRU has a grant for UL transmission. One or more CCA occasions may precede a subframe, FFP, and/or UL block.

A WTRU may have a grant for UL transmission for an FFP and/or a UL block perhaps for example if the WTRU has a grant for UL transmission for one or more subframes that may be included in the FFP and/or UL block.

A UL block may be a set of one or more subframes (that may be full or partial subframes). The subframes in a UL block may be consecutive (i.e., adjacent in time). A UL block may be associated with an FFP. A UL block may start at the beginning of an FFP. An FFP may include at least one UL block. A UL block may include one or more subframes for which a WTRU may have a UL grant. One or more subframes that may be in a UL block at one time (e.g., in one frame) may be used for DL at another time (e.g., in another frame). A subframe corresponding to a UL grant may be a subframe for which UL resources are granted.

One or more of a UL grant (and/or subframe for which UL resources are granted), an FFP, and/or a UL block may have, correspond to, and/or be associated with a CCA occasion and/or a set of CCA occasions. Perhaps for example if a WTRU determines that a channel might be unavailable during a CCA occasion and/or during a subset of a set of CCA occasions, the WTRU might not transmit on the channel at the time, in the subframe, and/or in at least one of the subframes that correspond to the UL grant (e.g., UL granted resources), FFP, and/or UL block associated with the CCA occasion and/or set of CCA occasions. Perhaps for example if a WTRU determines a channel may be unavailable during a CCA occasion and/or during one (and/or at least one) of a subset and/or set of CCA occasions, the WTRU may follow rules that correspond to a CCA failure that may include, but are not limited to, following a modified HARQ procedure, reporting a CCA failure, and/or increasing a count of CCA failures. The set and/or subset of CCA occasions may be configured by, for example, an eNodeB.

Perhaps for example if a WTRU determines a channel may be available during a CCA occasion and/or during one (and/or a subset) of a set of CCA occasions, the WTRU may transmit on the channel at the time, in the subframe, and/or in at least one of the subframes that correspond to a UL grant (e.g., UL granted resources), FFP, and/or UL block associated with the CCA occasion and/or set of CCA occasions. The WTRU may also transmit in some or all of the time between the determination that the channel may be available and the time and/or the at least one subframe (e.g., the start of the at least one subframe) that corresponds to the UL grant (e.g., UL granted resources), FFP, and/or UL block. For example, the WTRU may transmit when there is a gap in time between the end of the CCA occasion (and/or the last CCA occasion of the subset and/or set of CCA occasions) during which CCA succeeded and the start of the time and/or the at least one subframe that corresponds to the UL grant (e.g., UL granted resources), FFP, and/or UL block. The transmission in the gap may be referred to as a "reservation signal" since it may be used to reserve the channel until the granted and/or intended transmission may be made. The transmission in the gap may include one or more of data, a reference signal, and/or a transmission that may indicate that a LAA WTRU and/or eNodeB may be transmitting on the channel.

Perhaps for example if a WTRU determines a channel may be unavailable in one CCA occasion in a set and/or subset of CCA occasions that may be associated with a subframe, FFP, and/or UL block, the WTRU may perform CCA in a second, later, CCA occasion of the set and/or subset. The WTRU may perform CCA in one or more, or each of the CCA occasions in the set and/or subset of CCA occasions until CCA succeeds and/or may perform CCA in all of the CCA occasions in the set and/or subset until all CCA performed for all CCA occasions fail. Perhaps for example if and/or when a WTRU determines a CCA succeeds, the WTRU may transmit on the channel at the time and/or in a subframe that corresponds to a UL grant (e.g., UL granted resources), FFP, and/or UL block associated with the CCA occasion and/or set of CCA occasions. The WTRU might not perform CCA in other CCA occasions in the set and/or subset of CCA occasions that may be associated with the subframe, FFP, and/or UL block.

Perhaps for example if and/or when a WTRU determines that all the CCAs fail, the WTRU might not transmit on the channel at the time and/or in a subframe that corresponds to the UL grant (e.g., UL granted resources), FFP, and/or UL block associated with the CCA occasion and/or set of CCA occasions.

A WTRU may perform CCA in one or more CCA occasions prior to an FFP and/or UL block to determine the availability of the channel for one or more UL subframes in the FFP and/or UL block. Perhaps for example if the WTRU determines that CCA succeeds prior to the FFP and/or UL block, the WTRU may transmit in a UL subframe in the FFP and/or UL block for which the WTRU has a UL grant. Otherwise, the WTRU might not transmit in a UL subframes in the FFP and/or UL block. The WTRU may perform the CCA perhaps for example if the WTRU has a grant for at least one of the subframes and/or UL subframes in the FFP and/or UL block.

A WTRU may determine a CCA occasion and/or set of CCA occasions, for example, in which to perform CCA to determine the availability of a channel for transmission in a subframe of an FFP and/or UL block. Determination of a CCA occasion and/or set of CCA occasions may include determining the timing of the occasion and/or occasions that may include one or more of start time, end time, and/or duration that may be associated with the start of the subframe, FFP, and/or UL block. A WTRU may perform CCA in the determined CCA occasion and/or in at least one of the CCA occasions in a determined set of CCA occasions. Perhaps for example if a subset of the set of CCA occasions is configured and/or determined, the WTRU may perform CCA in at least one of the CCA occasions in the determined and/or configured subset.

A CCA occasion and/or occasions may depend on static or semi-static rules and/or configuration. A CCA occasion and/or set of occasions may be determined using one or both of the timing of a UL grant, for example the frame and/or subframe (e.g., frame and/or subframe number) in which the grant is received, and/or the UL grant's location (e.g., subframe and/or timing of reception of the grant) within an FFP.

A CCA occasion and/or set of occasions may be determined based on one or both of the timing of the granted resource (e.g., the frame and/or subframe or frame and/or subframe number) where the UL transmission is intended to occur, and/or the intended UL transmission and/or transmissions location within an FFP. For example, if a second granted UL transmission is to occur adjacent to a first granted UL transmission, the CCA occasions of the second granted UL transmission may reuse those of the first granted UL transmission.

A CCA occasion and/or set of occasions may be determined from the timing of the FFP (e.g., where within a frame an FFP begins).

A CCA occasion and/or set of occasions may be determined based on configuration information that may be provided by an eNodeB, for example, via higher layer signaling such as RRC and/or broadcast signaling and/or via physical layer signaling such as in a DCI format. The configuration may include one or more of:
- a number of CCA occasions in a set of CCA occasion,
- a subset of a configured set of CCA occasions,
- a size (e.g., length and/or duration) of a CCA occasion,
- a timing and/or pattern of the CCA occasions in a set and/or subset of CCA occasions,
- a delta time (and/or a set of delta times) before a starting point for a CCA occasion and/or set of occasions to begin, where the starting point may be the start or a certain time location (e.g., symbol and/or timeslot) within a subframe, e.g., 40 us before the start,
- a delta time (and/or a set of delta times) before a starting point for a CCA occasion to begin, where the starting point may be the start or a certain time location (e.g., subframe and/or symbol) within an FFP and/or UL block, e.g., 40 μs or 80 μs before the start,
- a minimum (e.g., allowed) time and/or a maximum (e.g., allowed) time for a CCA occasion,
- a minimum (e.g., allowed) time and/or a maximum (e.g., allowed) time a CCA occasion may begin prior to the start of an UL transmission for which resources are granted and/or an FFP and/or an UL block,
- a maximum (e.g., allowed) time for sending a reservation signal, and/or
- a parameter that identifies a delta time and/or a start time of a CCA occasion and/or set of occasions from a set of delta times and/or start times which may be and/or may have been configured.

A CCA occasion and/or set of occasions may be determined based on a cell-specific parameter such as a physical cell ID and/or global cell ID.

A CCA occasion and/or set of occasions may be determined based on a type of grant. For example, a grant for a single UL transmission may indicate a first set of possible CCA occasions and/or a grant for multiple UL transmissions may indicate a second set of possible CCA occasions.

A CCA occasion and/or set of occasions may be determined from based on a DCI format used for a UL grant. For example, a CCA occasion, set of occasions, and/or subset of a previously configured set of occasions may be indicated in a DCI format.

A CCA occasion and/or set of occasions may be determined based on the success or failure of a previous attempt to acquire the channel using a CCA occasion. For example, if a WTRU was unsuccessful at acquiring a channel for a previous UL grant using a first set of CCA occasions, it may use a new set of CCA occasions. Perhaps for example if the WTRU was successful at acquiring the channel using the first set of CCA occasions for a previous UL grant, it may reuse the first set of CCA occasions. The WTRU may hop between sets of CCA occasions based on whether one set has been successful or not.

A CCA occasion and/or set of occasions that may be used by a WTRU may be dynamically indicated to the WTRU. For example, a UL grant may include an indication of a CCA occasion and/or set of CCA occasions. For example, there may be PHY layer and/or higher-layer signaling, in some scenarios indicating parameters of an FFP (e.g., start and/or end of UL subframes and/or DL subframes). Such signaling may also indicate to the WTRU the CCA occasion and/or set of CCA occasions.

A CCA occasion and/or set of CCA occasions may be WTRU-specific and/or cell-specific.

The determination of a CCA occasion, set of CCA occasions, and/or a CCA occasion among a set of CCA occasions may be WTRU-specific and/or cell-specific. Perhaps for example if the determination is cell-specific, WTRUs in the cell may follow a same or similar rule and/or configuration.

One or more CCA occasions may be provided and/or used. A set of CCA occasions may be within one subframe.

For example, a set of CCA occasions may correspond to UL transmission in one or more subframes. A WTRU may have multiple sets of CCA occasions, perhaps for example one each for one or more, or each UL subframe. The set of CCA occasions may be used for a UL transmission within an FFP and/or UL block. For example, a WTRU may have a set of CCA occasions that may occur prior to the beginning of at least one of a subframe, an FFP, and/or a UL block. The WTRU may perform CCA in at least one CCA occasion of the set of CCA occasions to determine whether a channel may be available. Based on the WTRU's determination of channel availability, the WTRU may or might not transmit one or more granted UL transmissions that may correspond to the set of CCA occasions, e.g., in the subframe, FFP, and/or UL block.

Figure 4:
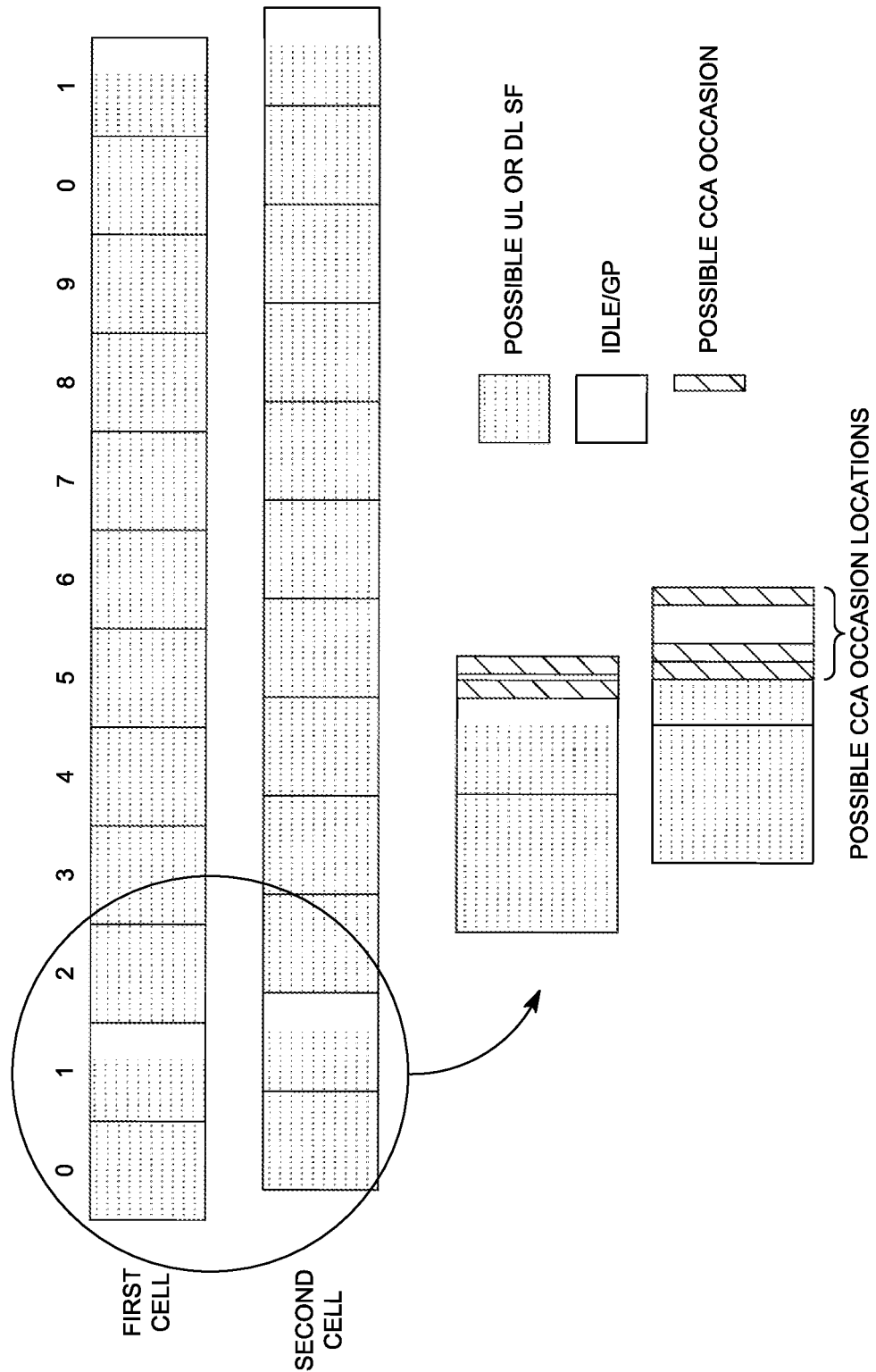
FIG. 4 is a block diagram illustrating an example of multiple clear channel assessment occasions occurring in an example subframe.

FIG. 4 shows diagram 400 illustrating an example of a subframe containing multiple CCA occasions. For example, subframe 2 may be the start of an FFP and/or UL block and/or it may be a subframe for which a WTRU may have a UL grant. Subframe 1 may be a special subframe that may include a DL part followed by an idle part and/or guard period (GP) during which the cell might not transmit. For example, the timing of the first and/or second cell might not be aligned. For example, one or more, or each, cell may have a different set of CCA occasions. A WTRU that may perform CCA in cell 1 may, for example, randomly choose between the two CCA occasions in its set. A WTRU that may perform CCA in cell 2 may, for example, randomly choose between the three CCA occasions in its set. Perhaps for example if the channel is available prior to both WTRUs performing CCA, the WTRU that chooses the earlier CCA occasion may find the channel free. The WTRU that finds the channel free may transmit a reservation signal perhaps for example if there is a gap in time between the end of the CCA occasion and the start of the granted resources.

For a set of CCA occasions, the order in which a WTRU may select and/or use such CCA occasions (e.g., for performing CCA) may be configured and/or dynamically indicated by, for example, an eNodeB. The order may be selected and/or determined, in some scenarios autonomously, by a WTRU. A WTRU may make the selection and/or determination randomly. The terms "selection" and "determination" may be used interchangeably herein.

A WTRU may select a CCA occasion, for example among a set of CCA occasions, for one or more, or each, UL grant, set of UL grants, FFP, and/or UL block. A WTRU may perform CCA in the selected CCA occasion.

Perhaps for example after performing CCA in a selected CCA occasion and/or determining that the CCA failed, a WTRU may select another CCA occasion among the set of CCA occasions that may occur prior to the subframe, FFP, and/or UL block where the UL transmission is intended to occur.

A selection of a CCA occasion from a set of CCA occasions may be determined based on the timing of the UL transmissions, such as a frame and/or subframe (e.g., frame number and/or subframe number) of a corresponding (e.g., granted and/or intended) UL transmission.

A selection of a CCA occasion from a set of CCA occasions may be determined perhaps for example based on parameters of an FFP, such as start and/or end locations, and/or a length of an FFP.

A selection of a CCA occasion from a set of CCA occasions may be determined perhaps for example based on a number of failed attempts at acquiring a channel. For example, upon failing to acquire the channel x times, a WTRU may select a $y^{th}$ CCA occasion. In another example, if a WTRU has failed to acquire the channel for x previous UL transmissions, it may select the $y^{th}$ CCA occasion.

A selection of a CCA occasion from a set of CCA occasions may be determined perhaps for example based on a measurement threshold configured and/or used for CCA. For example, different measurement thresholds may correspond to different CCA occasions. Depending on a measurement threshold configured and/or otherwise to be used, a WTRU may select a different CCA occasion. A WTRU may be provided with a set of possible transmission parameters for a UL transmission. Each such parameter may be tied to a different interference tolerance and/or UL transmission power. A WTRU may try different measurement thresholds using different CCA occasions to determine transmission parameters that may be used for the UL transmissions.

A set of CCA occasions may change semi-statically or dynamically, for example based on similar criteria and/or rules as those described herein for the WTRU selection of CCA occasions.

An FFP and/or a UL block may be substituted for one or more, or each, other and still be consistent with the techniques set forth herein.

A WTRU may receive an indication of a start of an FFP, for example the first subframe of an FFP, via explicit and/or implicit signaling (e.g., from an eNodeB). A WTRU may determine the start of an FFP and/or UL block as a function of one or more parameters, such as an end and/or a length of an FFP. A WTRU may determine a start (e.g., starting subframe) of an FFP and/or UL block from an end (e.g., ending subframe) of a previous FFP and/or UL block. A WTRU may determine a start (e.g., starting subframe) of an FFP and/or UL block as a time and/or subframe perhaps for example after (for example in some scenarios, immediately after) the end (e.g., ending subframe) of a previous FFP and/or UL block.

A WTRU may receive an indication of an end of an FFP, for example a last subframe of an FFP, via explicit and/or implicit signaling (e.g., from an eNodeB). A WTRU may determine an end of an FFP and/or UL block as a function of one or more parameters, e.g., such as a start and/or the length of an FFP. A WTRU may determine an end (e.g., ending subframe) of a FFP and/or UL block from a start (e.g., starting subframe) of a next FFP and/or UL block. A WTRU may determine an end (e.g., ending subframe) of a FFP and/or UL block as a time and/or subframe before (for example in some scenarios, immediately before) a start (e.g., starting subframe) of a next FFP and/or UL block.

A space between two FFPs may be a number of subframes between the starts of the two FFPs, the ends of the two FFPs, and/or the end of one of the FFPs and the start of the other, later FFP.

A WTRU may determine a start of a next FFP and/or UL block as a subframe and/or symbol perhaps for example after (in some scenarios, immediately after) an end subframe and/or symbol of the previous FFP, e.g., with no subframe and/or symbol in between. The space between a first FFP and a next consecutive FFP (second FFP) may be the same as the length of the first FFP A (e.g., the number of subframes in the first FFP). A WTRU may assume that the next consecutive FFP may start perhaps for example after the first FFP.

A WTRU may determine a start of a next FFP and/or UL block as a subframe and/or symbol that may be prior to the end of the current FFP. A WTRU may determine the start of the next FFP and/or UL block as a subframe and/or symbol that might not be (for example immediately) after the end of the current FFP, for example where the space between the start of the current FFP and/or UL block and the start of the next FFP and/or UL block may be larger than the length of the current FFP and/or UL block.

A WTRU may determine a start of one or more FFPs, such as a next FFP, from a configuration, an indication, and/or signaling that may be provided by an eNodeB and/or cell. The cell may be a PCell and/or a LAA cell. A configuration may be provided via higher layer signaling such as RRC signaling that may be WTRU-specific and/or broadcast signaling. A configuration may be provided via physical layer signaling such as in a DCI format. The terms "indication" and "configuration" may be used herein interchangeably.

A WTRU may receive an indication of an FFP and/or UL block start (e.g., a starting subframe) of an LAA cell from a cell that may be an associated PCell, an LAA cell, and/or another cell. The cell may indicate a start (e.g., a starting subframe) of a next n FFPs.

A WTRU may receive an FFP and/or UL block start (e.g., a starting subframe) indication as a part of broadcast Information. Such information may enable a cell's WTRUs and/or neighbor cells' WTRUs and/or neighbor cells to determine a start (e.g., a starting subframe) of a FFP and/or UL block of the cell. This may enable neighbor cells to perform interference coordination.

A WTRU may receive an FFP and/or UL block start (e.g., a starting subframe) indication as a part of higher-layer signaling. An eNodeB may indicate a new FFP and/or UL block start (e.g., a starting subframe) by using higher layer signaling such as an RRC command.

A WTRU may receive the FFP and/or UL block start (e.g., a starting subframe) indication as a part of a system information block (SIB). An existing SIB and/or a new LAA cell SIB may indicate a start (e.g., a starting subframe) of a next set of FFPs and/or UL blocks. Such information may be valid until a transmission of an update to the SIB.

A WTRU may receive a FFP and/or UL block start (e.g., a starting subframe) indication as a part of a new group DCI. A WTRU may be configured with a new radio network temporary identifier (RNTI) that may enable it to detect and/or decode a new group DCI that may include the start (e.g., a starting subframe) of one or more FFPs.

A WTRU may receive an FFP and/or UL block start (e.g., a starting subframe) indication as a part of a UL grant and/or a DL allocation. A WTRU may receive the FFP and/or UL block start (e.g., a starting subframe number) in a grant and/or allocation. For example, a UL grant may explicitly indicate the starting subframe of an FFP and/or UL block where the UL transmission is intended to be performed. A start (e.g., a starting subframe) of an FFP and/or UL block may be implicitly determined by a WTRU as matching a first subframe of a set of adjacent UL transmissions.

A start of one or more FFPs may be indicated periodically and/or aperiodically. A WTRU may expect a start (e.g., a starting subframe) of a next n FFPs to be indicated (e.g., in a DCI format) at specific instances, such as every m subframes, where m may be, for example, 40, 80 or 160 subframes. A FFP and/or UL block start (e.g., a starting subframe) indication may be included in other physical layer signal such as a reservation and/or busy signal. A FFP and/or UL block start (e.g., a starting subframe) indication may be included in a signal indicating other parameters of the FFP and/or UL block, such as an FFP and/or UL block length and/or UL/DL configuration.

A WTRU may receive an indication of a set of FFPs and/or UL block start (e.g., a starting subframe number) applicable to the next n FFPs. For example, a WTRU may be configured with a set of subframe numbers that may be applicable to the next n FFPs, perhaps to provide a future starting subframe number to that WTRU.

A WTRU may interpret the FFP and/or UL block start (e.g., a starting subframe number) relative to a start of a current or previous FFP and/or UL block start. For example, if a WTRU receives a new FFP and/or UL block start indication of XX subframes (e.g., XX=8) it may consider a next FFP starting in 8 subframes perhaps for example after the first subframe of the current FFP and/or UL block.

An FFP and/or UL block start (e.g., a starting subframe) may "hop" to different values. A WTRU may obtain and/or be configured with a set of FFP and/or UL block starts (e.g., starting subframe numbers). The WTRU may determine when to use an FFP and/or UL block start in the set dynamically. A WTRU may determine when to use an FFP and/or UL block start in the set based on an indication that may be provided by, for example, a cell. Such an indication may be provided dynamically using, for example, physical layer signaling (e.g., in a DCI format that may be for a UL and/or DL grant). The indication may explicitly indicate when a (e.g., a next) FFP and/or UL block starts, which may be used to determine when it is time to hop to a next value. Any indication value described herein for a next starting subframe number may indicate a hop to a next and/or pre-determined starting subframe. Hopping may be random where the randomness may be determined and/or controlled by the cell.

A WTRU may be configured with a hopping pattern for the start of the FFPs and/or UL blocks. The WTRU may use the hopping pattern to determine the start of an FFP and/or UL block.

A WTRU may determine a start of an FFP and/or UL block as a function of at least a frame number (e.g., system frame number (SFN)). For example, a start (e.g., a starting subframe) of an FFP and/or UL block may be a function of the frame where the FFP and/or UL block begins, and/or ends.

A WTRU may determine a start of an FFP and/or UL block as a function of an FFP Index. The FFPs and/or UL blocks may be indexed and/or a starting subframe number of one or more, or each, FFP and/or UL block may be a function of the FFP index.

A WTRU may determine a start of an FFP and/or UL block as a function of an LAA cell ID (e.g., physical cell ID, global cell ID) and/or an operator ID. Each LAA cell may use different hopping patterns and/or hopping rates in order to randomize the possible unlicensed channel access blocking.

A WTRU may determine a start of an FFP and/or UL block as a function of whether the WTRU was scheduled in a previous FFP. For example, a WTRU that may be scheduled in a previous FFP using a previous FFP starting subframe number may assume the next FFP starting subframe number would be the next value in a hopping pattern and/or sequence.

A WTRU may determine the start of an FFP and/or UL block as a function of whether a channel was determined available during the previous CCA. For example, a WTRU may assume a new FFP starting subframe number perhaps for example if a channel was determined to be busy during a previous CCA (e.g., in a previous FFP or for a same FFP).

For example, a subframe 2 and/or a subframe 7 may be the set of FFP and/or UL block starts. A WTRU may hop between the subframe 2 start and the subframe 7 start (e.g., determine the starting subframe of the FFP and/or UL block to be either subframe 2 or 7) according to an indication provided by, for example, signaling, SFN, cell ID, etc.

A WTRU may perform CCA (e.g., in a CCA occasion) prior to a determined FFP and/or UL block start to determine the channel availability for transmission in the FFP and/or UL block. The WTRU may or might not transmit in the FFP and/or UL block according to the determined availability.

A start (e.g., a starting subframe) of an FFP and/or UL block may depend on the channel availability (i.e., whether the channel is determined to be busy or available). A WTRU may consider a start (e.g., a starting subframe) of an FFP and/or UL block as a first available UL transmission opportunity, perhaps for example from among a set of potential UL transmission opportunities.

A WTRU may receive a UL transmission grant that may indicate more than one UL transmission opportunity (e.g., more than one UL subframe). The WTRU may use one or more of indicated UL transmission opportunities, for example, the first subframe of the channel that is determined to be free. A WTRU may perform CCA prior to one or more, or each, UL transmission opportunity. Perhaps for example, if the WTRU determines the channel as free during the CCA it may transmit a UL signal and/or may consider that UL transmission opportunity (e.g., UL subframe) as a start (e.g., a starting subframe) of an FFP and/or UL block. Perhaps for example if the channel is not free during such a UL subframe, the WTRU may check the next UL subframe and so on.

For example, a WTRU may be configured with a possible UL transmission that may occur in subframe 1 and/or 2. Perhaps for example if the WTRU successfully acquires the channel for a UL transmission in subframe x (where, in this example, x is either 1 and/or 2), then the FFP and/or UL block starting subframe may be considered to be subframe x.

For example, a WTRU may be granted multiple resources for multiple future UL transmissions (e.g., in multiple UL subframes). Perhaps for example if the WTRU determines that channel as free during a CCA related to a first transmission (e.g., subframe), the WTRU may attempt to evaluate the channel during the CCA for a second UL transmission (e.g., in a different subframe). In such an example, the first successfully acquired subframe may be considered the starting subframe of the FFP.

For example, a WTRU may be configured with possible FFP and/or UL block starts in subframes x and y where x may be subframe 2 and y may be subframe 7. Perhaps for example, if the WTRU successfully acquires a channel for an UL transmission in subframe x then the FFP and/or UL block starting subframe may be considered to be subframe x. Perhaps for example if CCA for the FFP and/or UL block starting in subframe x fails, the WTRU may determine that the FFP and/or UL block start is subframe y and/or may perform CCA at subframe y. The WTRU may begin again with subframe x in the next frame as a potential FFP and/or UL block start.

An FFP and/or UL block may be configured with a start (e.g., a starting subframe) and/or a length (e.g., a number of subframes).

A length of an FFP and/or UL block may depend on a start (e.g., a starting subframe) of the FFP and/or UL block and/or a start (e.g., a starting subframe) of a next FFP and/or UL block. For example, if a first FFP and/or UL block starts in subframe 1 of a first frame and/or the second FFP and/or UL block starts in subframe 5 of the next frame, the length of the first FFP and/or UL block may be up to 14 subframes. For example, if a first FFP and/or UL block starts in subframe 5 of a first frame and the second FFP and/or UL block starts in subframe 1 of the next frame, then the length of the first FFP and/or UL block may be up to 6 subframes.

A length of an FFP and/or UL block may be fixed. For example, a first FFP and/or UL block may be indicated by its start (e.g., a starting subframe) and/or its fixed length (e.g., in a number of subframes). A next FFP and/or UL block may be determined by its start (e.g., a starting subframe) as well as by ensuring that there is no overlap with a previous FFP and/or UL block. For example, a first FFP and/or UL block may be configured with length of 10 ms and/or may start in subframe 5 of a first frame and/or may end in subframe 4 of a second frame. Perhaps for example if a second FFP and/or UL block may be configured to start in any of subframes 0, 1, 2, 3, and/or 4, then it may begin in the third frame. Otherwise perhaps for example if a second FFP and/or UL block may be configured to start in any of subframes 5, 6, 7, 8, and/or 9, then it may begin in the second frame.

A length of an FFP and/or UL block may depend on the start (e.g., a starting subframe) of a first FFP and/or UL block, the start (e.g., a starting subframe) of a second and/or adjacent FFP and/or UL block, and/or a maximum value. For example, a length of the FFP and/or UL block may be determined as the minimum of the maximum value and the separation in subframes of the starting subframe of the first FFP and/or UL block and the starting subframe of the second FFP and/or UL block.

There may be a minimum length of an FFP and/or UL block. A length of an FFP and/or UL block may be a maximum of the minimum allowable value and the separation in subframes between the start (e.g., a starting subframe) of a first FFP and/or UL block and the start (e.g., a starting subframe) of a second FFP and/or UL block. For example, if a minimum FFP and/or UL block length is 4 ms and/or a first FFP and/or UL block has a starting subframe 0 and the second FFP and/or UL block has a starting subframe 2, then the second FFP may start in subframe 2 of a next frame.

There may be subframes that do not belong to any FFP and/or UL block. For example, if a maximum length of an FFP and/or UL block is 10 ms and/or a first FFP and/or UL block starts in subframe 0 of a first frame and/or the second FFP and/or UL block starts in subframe 3 of a second frame, then subframes 0, 1, and/or 2 of the second frame might not belong to either FFP and/or UL block. Such subframes may be considered completely idle by a WTRU and/or the WTRU might not expect to be scheduled for UL and/or DL transmissions using such subframes. Such subframes may be valid for the transmission of certain types of signals and/or channels (e.g., DRS, broadcast channel, etc.)

A starting subframe of an FFP and/or UL block may be changed by shifting among and/or cycling through possible values and/or UL/DL configurations. Shifting and/or cycling may occur periodically (e.g., every n frames), aperiodically (e.g., by dynamic indication), and/or as a function of one or more of SFN, cell ID (e.g., physical cell ID and/or global cell ID), and/or operator ID. Shifting and/or cycling may be configured and/or may be determined as a function of a configuration that may be provided by an eNodeB by, for example, signaling such configuration information using physical layer and/or RRC signaling. Signaling and/or configuration may indicate directly and/or indirectly one or more starting subframes that may be used for an FFP and/or UL block start. For example, a shifting and/or cycling pattern may be configured and/or the selection among a set of known shifting and/or cycling patterns may be configured.

UL/DL configurations may reuse existing TDD UL/DL configurations. A start (e.g., a starting subframe) of an FFP and/or UL block may depend on specific subframes within a TDD UL/DL configuration. Shifting and/or cycling of FFP and/or UL block starting subframes may be achieved by selecting among, and/or cycling through, TDD UL/DL configurations. The TDD UL/DL configuration that may be used to determine an FFP and/or UL block start may be indicated by signaling and/or may be determined based on one or more of SFN, cell ID (e.g., physical cell ID or global cell ID), and/or operator ID. The shifting and/or cycling pattern for the TDD UL/DL configurations or the selection among a set of known shifting and/or cycling patterns may be configured and/or indicated by signaling.

A starting subframe of an FFP and/or UL block may be anchored to multiple possible subframes of a TDD UL/DL configuration (for example special subframes). Flexible starting subframes may be achieved by cycling the FFP and/or UL block starting subframe through valid anchor subframes of a TDD UL/DL configuration. An anchor subframe that may be used to determine an FFP and/or UL block start may be indicated by signaling and/or may be determined based on one or more of SFN, cell ID (e.g., physical cell ID and/or global cell ID), and/or operator ID. The shifting and/or cycling pattern for the anchor subframe or the selection among a set of known shifting and/or cycling patterns may be configured and/or indicated by signaling.

Non-legacy UL/DL configurations may be defined for LAA cell operation. Solutions described herein for TDD UL/DL configurations may be used. For example, a WTRU may be configured to cycle through a set of possible UL/DL configurations.

A WTRU may be configured with a timing and/or subframe offset between a licensed cell (e.g., a PCell) and an LAA cell (e.g., an SCell). For example, the timing of an LAA cell may be such that subframe n of the LAA cell may align with subframe 0 of the other cell (e.g., a PCell). In another non-limiting example, an offset may be in subframes and/or symbols. The offset may be cycled (and/or dynamically indicated), which may enable flexible starting of an LAA cell frame relative to licensed cell timing, and/or which may enable flexible starting subframe of the FFP and/or UL block. The offset may be indicated by signaling (e.g., physical and/or higher layer signaling) and/or may be determined based on one or more of SFN, cell ID (e.g., physical cell ID and/or global cell ID), and/or operator ID.

An FFP and/or UL block start (e.g., a starting subframe) may depend on a previous FFP and/or UL block starting subframe (and/or a previous FFP and/or UL block length). A WTRU might miss an FFP and/or UL block start (e.g., a starting subframe) indication and/or might erroneously determine the start (e.g., starting subframe) of a next FFP and/or UL block. WTRUs may be assigned with specific instances where a start (e.g., a starting subframe) may be predetermined, perhaps for example using techniques set forth herein, such as where a start (e.g., a starting subframe) might not be dependent on parameters of a previous FFP and/or UL block.

A WTRU may determine a start (e.g., a starting subframe) of FFPs and/or UL blocks of an LAA cell as a function of the System Frame Number (SFN) and/or cell ID of a licensed cell and/or an LAA cell using one or more or a combination of the techniques set forth herein.

One or more (and in some scenarios, perhaps all) WTRUs may receive k (e.g., k=2) different FFP starting subframe numbers within a radio frame (e.g., fs[1, . . . , k]). For example, fs={2,7} where fs(1)=2 and fs(2)=7.

One or more (and in some scenarios, perhaps all) WTRUs may be configured with m consecutive FFPs and/or UL blocks that may have a same start (e.g., a starting subframe). For example, WTRUs may use a same FFP and/or UL block starting subframes for m consecutive radio frames. For example, m may be 4.

One or more, or each WTRU may determine an FFP starting subframe number in a radio frame SFN_number for an LAA cell with cell ID cell_id by calculating an index using equation (1):

$$\text{Index}(\text{SFN\_number})=(\text{cell\_id}+\text{floor}(\text{SFN\_number}/m)) \mod k \quad (1)$$

and determining an FFP starting subframe (e.g., starting_subframe) using equation (2):

$$\text{starting\_subframe}(\text{SFN\_number})=f_s(\text{index}(\text{SFN\_number})+1). \quad (2)$$

Different LAA cells may have FFPs with different starting subframes. Perhaps if one cell may potentially block another cell's channel access for k consecutive radio frames, in the next set of k consecutive radio frames, the previously blocking cell might no longer block the previously blocked LAA cells.

A variable and/or flexible length of an FFP and/or UL block may be used. A flexible length of an FFP and/or UL block may be changed periodically and/or aperiodically and/or may enable mitigation of the blocking of a cell and/or a cell's WTRUs (e.g., where a cell and/or a cell's WTRUs are systematically blocked by another cell and/or another cell's WTRUs). Techniques set forth herein using an example UL block may also be implemented using an FFP. All such techniques are contemplated herein.

The length of an FFP may be variable and/or may differ in one or more, or each, FFP. For example, a first FFP may have length 10 ms (e.g., may begin in subframe x and may end in subframe x+9) and the next FFP may be of length 5 ms. The set of possible FFP lengths may be predetermined and/or may be configured to particular values, such as, but not limited to, 4 ms, 5 ms, 8 ms, and 10 ms.

Figure 5:
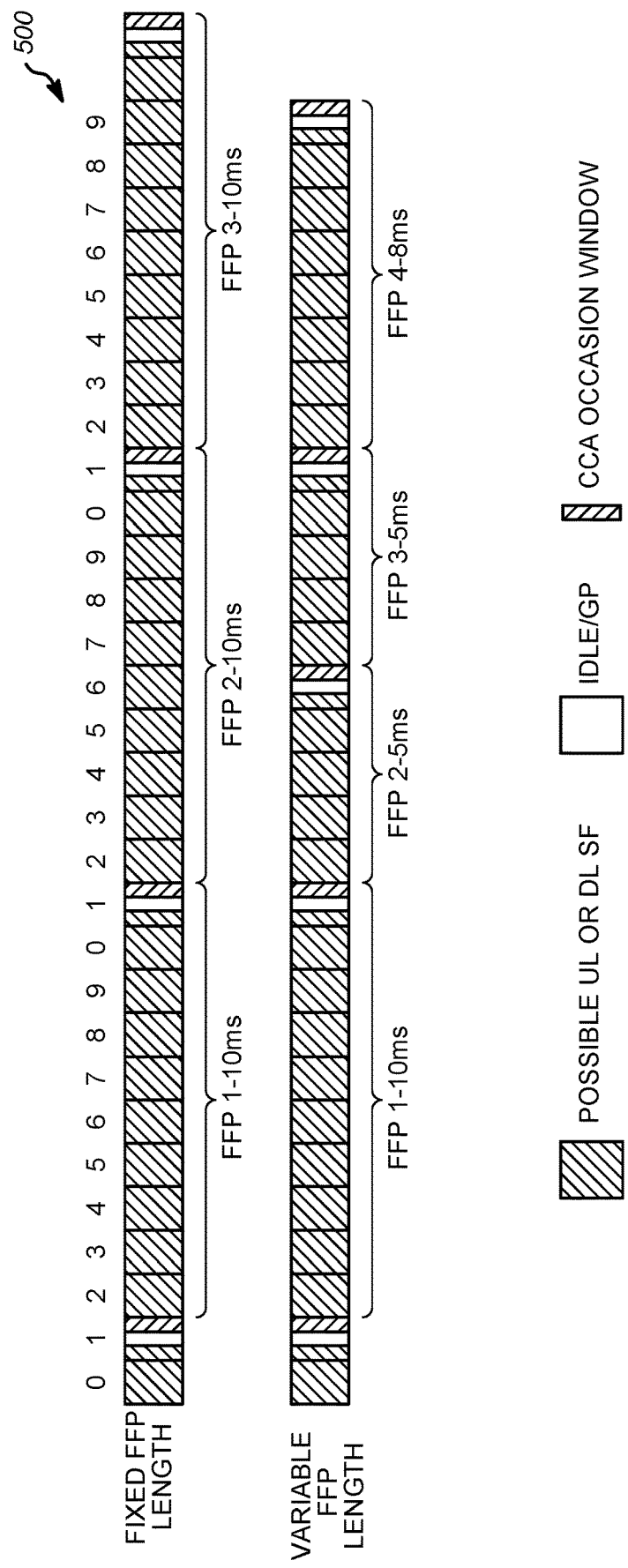
FIG. 5 is a diagram illustrating example fixed and/or variable fixed frame periods.

FIG. 5 illustrates non-limiting examples of a fixed FFP length and/or a variable FFP length. For the fixed FFP length example, one or more, or each, of the FFPs has a same length of 10 ms. For the variable FFP length example, the FFP lengths vary from 5 ms to 10 ms. A variable length FFP may be referred to as a frame period (FP) and/or a variable frame period (VFP).

A WTRU may be configured with an FFP length semi-statically by higher layer signaling. Such an FFP length may be valid until further configuration. A WTRU may be configured with an FFP length in a dynamic manner. For example, prior to and/or at the beginning of an FFP, WTRU may be configured with one or more parameters for the FFP, where the parameters may include an FFP length. The indication of an FFP length may be provided using one or more of physical layer signaling, an indication from a PCell, broadcast information, higher-layer signaling, system information (e.g., a system information block (SIB)), a new (for example, a fresh or heretofore undefined) DCI and/or group DCI, a UL grant, and/or DL allocation.

Physical layer signaling may be used to indicate FFP length. For example, a cell (e.g., an LAA cell and/or a PCell) may indicate a length of an FFP periodically and/or aperiodically. A WTRU may expect a length of the next n FFPs to be indicated at specific instances (such as every m subframes, where m may any value, such as 40, 80, or 160). An FFP length indication may be included in another physical layer signal transmitted by an LAA cell, such as a reservation and/or busy signal. An FFP length may be included in a signal indicating other parameters of an FFP (such as an FFP starting subframe and/or UL/DL configuration). A PCell may indicate a length of the next n FFPs.

Broadcast information may be used to indicate FFP length. Such information may enable one or more of the cell's WTRUs, neighbor cell's WTRUs, and/or neighbor cells to determine the parameters of an FFP of the cell. This may enable neighbor cells to perform interference coordination.

Higher-layer signaling may be used to indicate FFP length. An eNodeB may indicate a new FFP length by using higher layer signaling such as a RRC signaling (e.g., an RRC message and/or an information element in a message).

System Information (e.g., a SIB) may be used to indicate FFP length. An existing SIB and/or a new (for example fresh or previously undefined) LAA SIB may indicate an FFP length of a next set of FFPs, and/or such information may be valid until a transmission of an update to the SIB is sent.

A DCI or group DCI (e.g., a new DCI) may be used to indicate FFP length. WTRUs may be configured with an RNTI (e.g., a new RNTI) that may enable such WTRUs to detect and/or decode a DCI and/or group DCI (e.g., a new DCI) that may include an FFP length.

An FFP length may be indicated as part of a UL grant and/or DL allocation. A WTRU may receive an indicated FFP length in a grant and/or allocation. For example, a UL grant may explicitly indicate an FFP length of an FFP where a UL transmission may be intended to be performed. A length of an FFP may be implicitly determined by a WTRU as a function of an element of a UL grant.

A WTRU may receive an indicated set of FFP lengths that may be applicable to a next n FFPs. For example, any of the disclosed techniques that may provide an FFP length may configure a WTRU with a set of FFP lengths that are applicable to a next n FFPs.

An FFP length may hop to different values. A WTRU may be configured with a set of FFP lengths and/or may receive an indication (e.g., dynamically) when it is time to hop to a next value. An indication value for the next FFP length may indicate a hop to a next and/or predetermined and/or configured FFP length.

An FFP length (e.g., for a specific FFP) may be determined by a function, one or more of a frame number, an FFP index, an LAA cell ID (e.g., physical cell ID and/or global cell ID), an operator ID, whether a WTRU was scheduled in a previous FFP, and/or whether a previous FFP CCA was successful.

An FFP length may be a function of a frame where the FFP begins or ends.

FFPs may be indexed and/or an FFP length may be a function of an FFP index.

A length of an FFP may be determined based on an LAA cell ID. Each LAA cell may use different hopping patterns and/or hopping rates, for example, in order to randomize the possible unlicensed channel access blocking.

Whether a WTRU was scheduled in a previous FFP may be used to determine a length of an FFP. For example, if a WTRU is scheduled in a previous FFP using a previous FFP length, the WTRU may assume the next FFP length has hopped to a new value.

Whether a previous FFP CCA was successful may be used to determine a length of an FFP. For example, a new FFP length may be used if a previous CCA attempt (e.g., in a previous FFP and/or for a same FFP) was not successful.

There may be multiple possible FFP lengths overlapping one or more, or each, other. FFP lengths may be different, or differ, perhaps for example depending on when one or more WTRU(s) may be able to perform CCA and/or possibly acquire a channel for UL transmissions and/or depending on when a cell is able to perform CCA and/or possibly acquire a channel for DL transmissions. For example, in a frame, there may be a first FFP defined over subframes 0 to 9, a second FFP defined over subframes 1 to 8, a third FFP defined over subframes 3 to 6, and/or a fourth FFP defined over subframes 4 to 7. Depending on when one or more WTRUs and/or cells are able to perform CCA and/or possibly acquire the channel to begin an FFP, the FFP length may be different.

CCA occasions (e.g., over multiple subframes) may be for a single UL grant and/or DL allocation or for multiple UL grants and/or DL allocations. For example, a WTRU may be provided with a grant for UL transmission in a first subframe of a next FFP. Perhaps for example if the WTRU fails to acquire the channel for subframe 0 and/or 1 (e.g., CCA fails for transmission in these subframes) and/or the WTRU acquires the channel for subframe 3, then the FFP may be defined over subframes 3 to 6 and/or may be of length 4 ms. In another example a WTRU may have a first UL grant for a transmission in subframe 0 and/or a second UL grant for a transmission in subframe 1. Perhaps for example if the WTRU is successful at acquiring the channel for subframe 0, it may perform its UL transmissions in subframes 0 and/or 1 and/or the FFP length may be 10 ms (subframes 1 to 9 in the example above). Perhaps for example if the WTRU is successful (for example only successful) in acquiring the channel for subframe 1, then the second UL transmission may be performed, the first may be dropped, and/or the FFP may be defined to have a length of 8 ms (subframes 1 to 8 of the example above).

In another non-limiting example, a WTRU may be configured semi-statically and/or dynamically, with multiple possible starting subframes of an FFP (perhaps for example with a single ending subframe). This may enable variable FFP lengths, which may for example depend on when the FFP is successfully begun, perhaps due to a successful channel acquisition.

WTRUs from different cells may attempt to acquire (e.g., perform CCA for) a channel simultaneously for UL transmissions. The number of subframes used for UL in an FFP might not be the same in all cells. It might not be possible to have UL transmissions in one or more cells and/or DL transmissions in one or more cells (for example simultaneously). Perhaps for example upon UL subframes being completed for some or all cells, the cells may be able to perform CCA and/or possibly acquire the channel for DL transmissions for the remaining duration of the FFP. Some cells may be UL traffic heavy and/or others may be DL traffic heavy, for example, if a first cell has a 90%/10% ratio of UL/DL traffic and/or a second cell has a 10%/90% ratio of UL/DL traffic. The WTRUs from one or more, or both, cells may successfully acquire the channel for UL transmissions in the first subframe of an FFP and/or UL block and/or may keep the channel for one or more, or each, WTRU's respective UL block (e.g., if a single CCA is used for the entire block of UL transmissions). WTRUs of the first cell may keep the channel for UL transmissions for 9 subframes (assuming, for this example, an FFP length of 10 ms). The second cell might not be able to obtain the channel for DL transmissions until the 10th subframe. The first cell's UL heavy transmissions may block the second cell's ability to use the channel for its DL heavy transmissions.

Cells (e.g., a first and/or second cell) may have an interface where they may negotiate for a fairer split of the UL/DL configuration of the unlicensed channel. There may be cases, such as when the cells are from different operators, where no coordination may be used.

A cell may determine, for example as a result of blocking by another cell, that it does not have enough DL subframes to support its DL transmissions. The cell that may have previously scheduled UL transmissions may cancel those UL transmissions, for example to use the subframes for DL transmission.

Conditional scheduling may be used for an LAA cell. The resources granted for UL and/or DL transmissions may be used when CCA for a channel succeeds and/or the serving cell has provided an indication that the scheduled UL and/or DL transmissions have not been dropped, postponed, and/or cancelled.

For example, a cell may schedule one or more of its WTRUs for one or more UL transmissions in an upcoming and/or future FFP and/or UL block, perhaps at least k subframes before the UL transmissions are intended to occur. The scheduling and/or grant may be provided in one FFP for UL transmission in another FFP. The cell may send a WTRU and/or WTRUs (perhaps in some scenarios later and/or before one or more UL transmissions) an indication to drop, postpone, and/or cancel one or more of the UL transmissions.

Such an indication may be sent perhaps for example after (e.g., in a subframe immediately after) a cell acquires a channel for DL transmissions. The cell may indicate to its WTRUs that they may monitor control channels, for example, given that they are not expected to perform their UL transmissions and/or that they may now be scheduled for DL transmissions. Monitoring subframes for DI may be understood by WTRUs from such an indication to drop, cancel, and/or postpone, for example without the use a separate indication.

A WTRU may be configured with conditional UL and/or DL scheduling. Such a WTRU may determine that a UL and/or DL scheduling (e.g., for an LAA cell) may be conditional using one or more of a higher layer configuration, broadcasted information, timing of a scheduling grant and/or scheduled resources, DCI format, and/or a type of scheduling.

A higher layer configuration may indicate whether scheduling may be conditional. The WTRU may be semi-statically configured with conditional and/or non-conditional scheduling, perhaps for example by RRC configuration.

Broadcasted information may indicate whether scheduling may be conditional. The broadcasted information may be sent from a network entity (for example an eNB or a cell) to one or more WTRUs. For example, an existing SIB and/or a new LAA SIB may indicate whether scheduling grants and/or allocations by an LAA cell and/or for an LAA cell may be conditional. A broadcasted channel and/or signal from a cell (e.g., an LAA cell reservation or busy signal, reference signals, channel transmitting FFP parameters, etc.) may indicate whether scheduling grants and/or allocations by an LAA cell may be conditional.

Timing of a scheduling grant and/or scheduled resources may indicate whether scheduling may be conditional. A subframe where a grant is transmitted and/or a subframe for which a grant is intended to be transmitted may indicate to a WTRU whether conditional scheduling may be used. A subframe number, and/or a subframe location within an FFP, may be used. For example, a UL transmission intended for a first subframe of an FFP may be non-conditional while a UL transmission intended for another subframe of an FFP may be conditional.

A DCI format may indicate whether scheduling may be conditional. There may be some DCI formats used for conditional scheduling and/or other DCI formats used for non-conditional scheduling. A DCI format for conditional formatting may include a bit flag. Such a flag may indicate whether a grant and/or allocation may be conditional.

A type of scheduling may indicate whether scheduling may be conditional. For example, cross-carrier scheduling (e.g., where a grant and/or allocation may be transmitted by a cell different from a cell expecting the transmission) may be conditional while self-scheduling (e.g., where a grant and/or allocation is transmitted by a same cell expecting the transmission) may be non-conditional, or vice versa.

A WTRU may be conditionally scheduled for a UL or a DL transmission. Such a WTRU may use an indication to determine whether to proceed with the UL transmission and/or the DL reception. Such an indication may be dynamic, enabling a cell to have increased flexibility to choose a UL/DL configuration of an FFP, perhaps for example at any time. An indication used to trigger a WTRU to proceed with a UL transmission and/or a DL reception may be provided using one or more of PCell signaling, reservation signal transmission, presence of reference signals, shortened control signaling, and/or measurement threshold.

PCell signaling may trigger and/or indicate to a WTRU to proceed with a UL transmission and/or a DL reception. For example, a transmission in a control channel of a PCell may indicate that a UL and/or a DL transmission in an LAA SCell may or might not be valid for a current subframe and/or a future, perhaps adjacent, subframe.

A reservation signal transmission may trigger and/or indicate to a WTRU to proceed with a UL transmission and/or a DL reception. For example, during a time that the WTRU may be configured to perform CCA, an LAA cell may transmit a reservation signal. Such a signal may be detected and/or decoded by the WTRU and/or may indicate to the WTRU whether the condition for the scheduled transmission is met.

A presence of one or more reference signals may trigger and/or indicate to a WTRU to proceed with a UL transmission and/or a DL reception. For example, reference signals (e.g., PSS, SSS, CRS, CSI-RS, PRS, DRS, and/or any other reference signal) may be transmitted in a subframe, perhaps for example in the same subframe as that intended for UL transmission and/or in an adjacent subframe, perhaps to indicate that scheduled UL transmissions may be dropped and/or delayed.

Shortened control signaling may trigger and/or indicate to a WTRU to proceed with a UL transmission and/or a DL reception. There may be a control channel region that may enable shortened control signaling by an LAA cell to indicate whether the condition to transmit and/or receive has been met for a current and/or future subframe. Such shortened control signaling may include a simple bit flag indicating whether the condition for transmission and/or reception may be considered by the WTRU to be satisfied.

A measurement threshold may trigger and/or indicate to a WTRU to proceed with UL transmission and/or DL reception. The WTRU may be configured with a measurement resource (e.g., a reference signal) and/or a measurement threshold that the WTRU may use to determine whether the condition to proceed with the previously scheduled UL transmission and/or DL reception is met.

Note that a trigger type (i.e., a specific element that may be satisfied to proceed with a UL transmission and/or a DL reception) may be included in a configuration of conditional scheduling as set forth herein. For example, higher layer signaling that may indicate that the scheduling may be conditional may also include a trigger to be used by a WTRU to satisfy a condition to proceed with a UL transmission and/or a DL reception. In another example, a scheduling grant and/or allocation may include an element indicating a trigger type to use as a condition to proceed with a UL transmission and/or a DL reception.

Perhaps for example upon, or as a result of, failure to acquire a channel in a fixed or configured amount of attempts in a configured window of time (e.g., determining that a channel is busy in a fixed or configured number of CCA occasions), a WTRU may inform a cell that it may be blocked. A WTRU may report this failure and/or blocking on a PCell transmission, for example as part of a periodic and/or aperiodic CSI report.

A WTRU may indicate the failure and/or blocking using higher layer measurement reporting. The triggers for such reporting may be configurable in the WTRU and/or may include one or more of being unable to access the channel x amount of CCA attempts (perhaps for example, in a window of y subframes and/or frames), experiencing interference greater than a threshold (perhaps for example, x amount of times in a window of y subframes and/or frames), and/or failure to acquire a channel for a transmission when a WTRU may have had one or more CCA occasions to determine the availability of the channel (perhaps for example there may be an attempt to acquire the channel for the one or more transmissions).

Experiencing interference greater than a threshold, for example, x amount of times in a window of y subframes and/or frames, may trigger a WTRU to report blocking. Such a threshold may be different than that used for CCA. For example, a threshold to report blocking may be more or less sensitive to interference than a CCA threshold.

A WTRU may determine that a specific cell and/or WTRU may be blocking (e.g., systematically blocking) its attempts at acquiring a channel (e.g., a specific cell and/or WTRU may be the cause for another WTRU observing that a channel is busy during CCA occasions). Such a WTRU may transmit a blocking report perhaps for example if a set of cells has blocked it from transmitting more than one time within a window that may be configurable. For example, if a WTRU is blocked by a first cell and/or one or more of its WTRUs in an FFP and not blocked again by that cell and/or one or more of its WTRU during a predetermined and/or configured window, such a WTRU might not report that the cell and/or one or more of its WTRUs is blocking it. Perhaps for example if such a WTRU is blocked by a particular cell and/or one or more particular WTRUs in a cell multiple times in a predetermined and/or configured window, the WTRU may report that the particular cell and/or one or more particular WTRUs in a cell are blocking it.

Perhaps for example to determine a cell that is blocking it, a WTRU may listen to one or more of the FFP parameter indications of neighboring cells as described herein.

A WTRU may detect a signature of an interfering signal (such as a reservation signal and/or another channel) and/or may determine the particular cell and/or one or more particular WTRUs in a cell that are blocking it.

A blocking report may include one or more cells and/or one or more WTRUs. For example, a WTRU may be blocked by UL transmissions of two different cells in multiple adjacent FFPs and/or these multiple blocking events may be sufficient to trigger blocking reports for the multiple cells.

PCell may trigger a WTRU to transmit a blocking report, for example upon or as a result of being unable to receive one or more UL transmissions from the WTRU. The blocking report from the WTRU may include a list of neighbor cells, and/or WTRUs, and/or interference measurements, such as those associated with the cells and/or WTRUs. The WTRU may indicate whether the interference is experienced from usage of the unlicensed channel itself and/or from usage of adjacent channels.

A WTRU may be configured to fall back to a PCell (and/or another licensed or unlicensed cell, perhaps for example on another channel) when a transmission on an unlicensed cell is not achieved perhaps for example due to not being able to acquire the channel. A WTRU may indicate, within a transmission, that it was blocked from transmitting on the originally scheduled channel.

A WTRU may be configured with multiple LAA cells, one or more, or each of which may be using different channels and/or carriers. Perhaps upon determining (perhaps for example using any techniques set forth herein) that the WTRU is being blocked from acquiring a channel corresponding to a configured LAA cell, the WTRU may report to a cell (e.g., a PCell) that it is blocked from transmitting and/or receiving on the LAA cell.

A WTRU may be provided with fallback resources, for example on a second channel, for which the WTRU may perform a scheduled UL transmission perhaps for example if the WTRU has been blocked from transmitting in a first channel. Perhaps in addition to indicating to, for example, a PCell, that the WTRU is blocked from transmitting on a first channel, the WTRU may also indicate to the PCell that it is using a fallback channel for transmission.

Fallback channel parameters used by one or more WTRUs may be cell specific and/or may be WTRU specific. Fallback channel parameters may include one or more of a channel frequency, a cell ID, a channel bandwidth, a reference signal configuration, a MIB, and/or relevant SIBs of a fallback channel. A channel frequency may also be included in a list of fallback channel parameters. A channel associated with that frequency may use licensed and/or unlicensed spectrum.

A cell ID may be included in the list of fallback channel parameters. A fallback channel may reuse a same cell ID as that used by an originally intended LAA cell. This may reduce complexity when a WTRU creates relevant channels and/or signals. A cell ID may be different from that used by an originally intended LAA cell.

A channel bandwidth may be included in a list of fallback channel parameters. This bandwidth might not match that of an originally intended LAA cell. Where it does now, a WTRU may modify transmission parameters, such as transport block size, modulation, and/or coding scheme.

A WTRU may be configured with a set of channels on which it may perform a UL transmission. Such a WTRU may attempt CCA on the channels of the set and may select one or more of the channels that it determined may be available and/or idle for its UL transmission. The WTRU may also report to another cell (e.g., a PCell) that one or more channels may be systematically blocked, perhaps for example using any techniques set forth herein.

Figure 6:
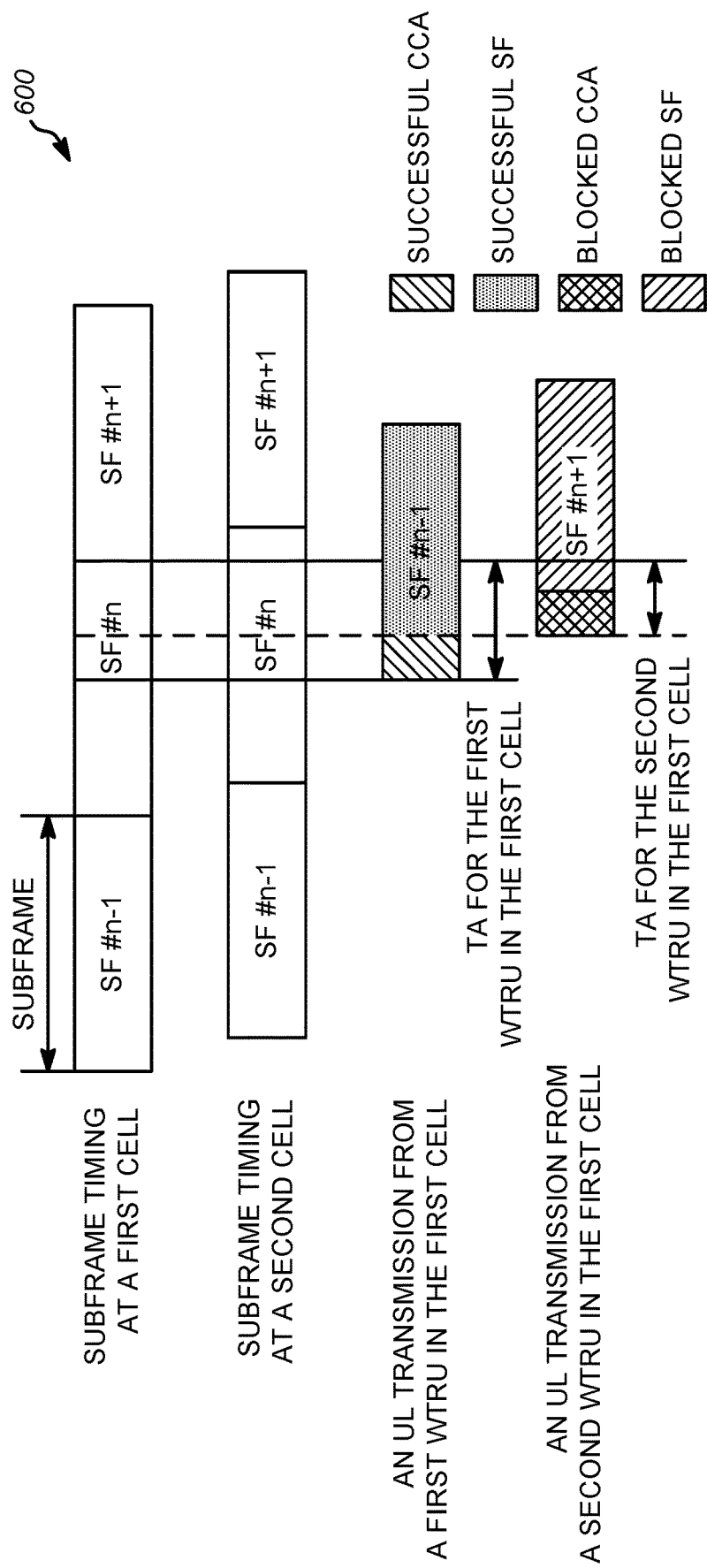
FIG. 6 is a diagram illustrating an example blocked clear channel assessment.

WTRUs of a same cell may share an LAA channel (e.g., they may transmit on a same channel at a same time). Due to timing differences, even small differences, a first WTRU may acquire a channel and/or start transmitting while a second WTRU performs CCA on the channel, which may cause the second WTRU's CCA to fail. FIG. 6 shows diagram 600 illustrating a situation where a timing advance for a first WTRU may be larger than that for a second WTRU. For example, perhaps due to the earlier start of the UL of the first WTRU, the first WTRU may perform CCA before the second WTRU and/or may start UL transmission, which may cause the CCA of the second WTRU to fail.

Figure 7:
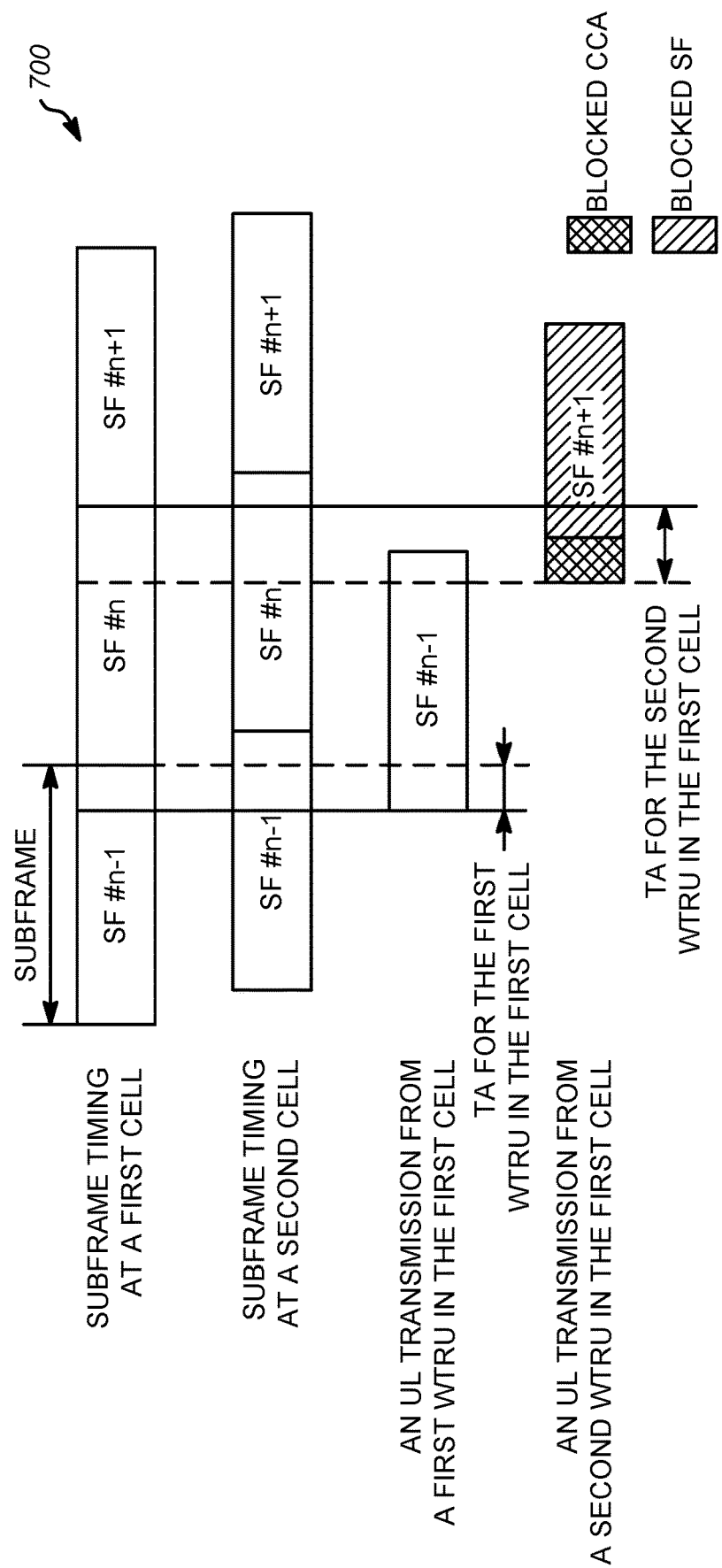
FIG. 7 is a diagram illustrating another example blocked clear channel assessment.

Differences in timing between a first WTRU and a second WTRU may result in the end of the first WTRU's transmission blocking and/or overlapping with the CCA of the second WTRU, causing the second WTRU's CCA to fail, as shown in diagram 700 of FIG. 7.

Figure 8:
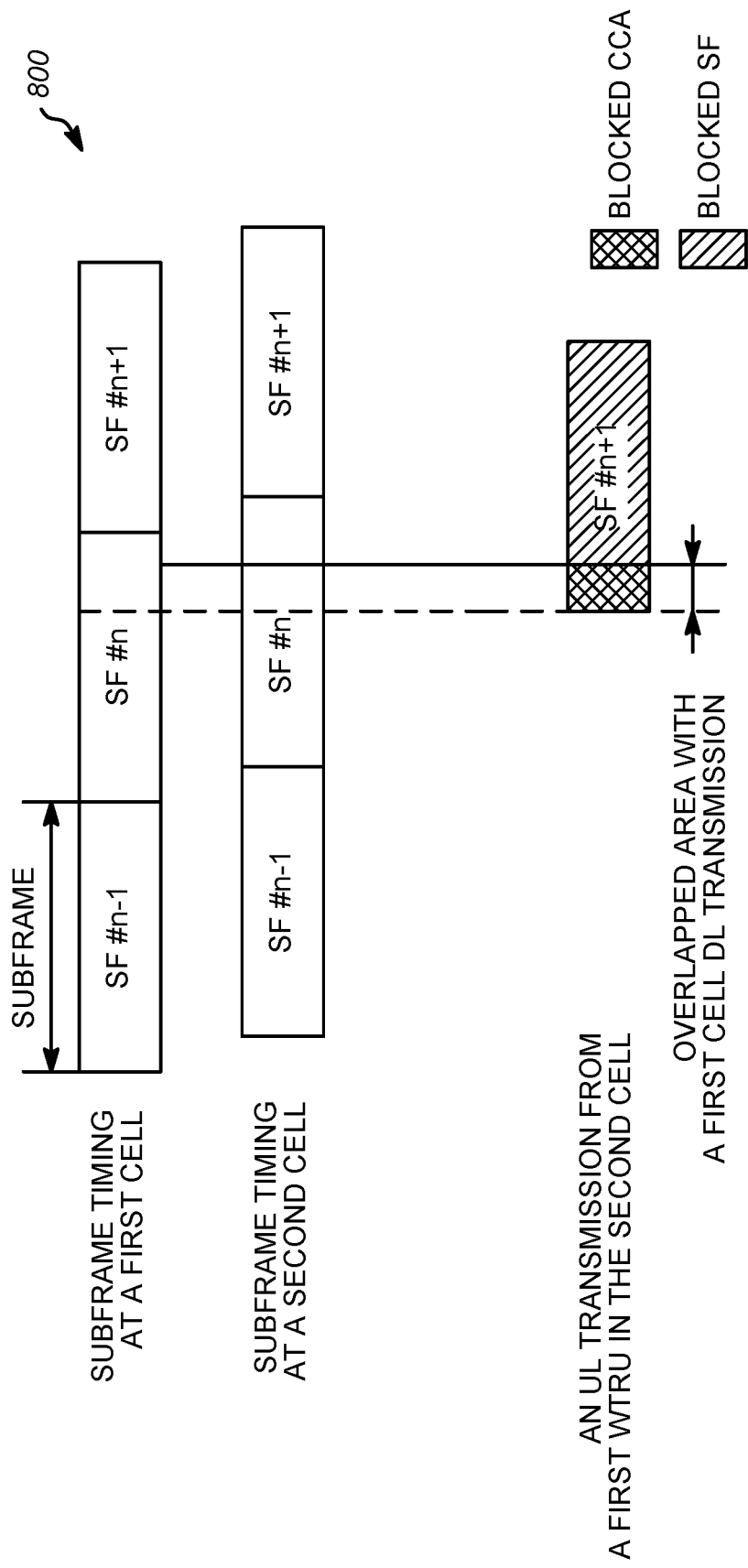
FIG. 8 is a diagram illustrating another example blocked clear channel assessment.

Perhaps utilizing asynchronous subframe timing across LAA cells, as shown in diagram 800 of FIG. 8, a DL transmission in a first cell may cause a CCA of a WTRU in a second cell to fail. In this example, a first cell transmits a downlink transmission in SF #n. A WTRU in a second cell performs CCA in a window of time reserved for CCA at the end of SF #n in the second cell. The CCA window in the second cell overlaps the DL transmission in the first cell, which may cause the second WTRU's CCA to fail.

A WTRU and/or a cell (e.g., an LAA WTRU and/or cell) with which another WTRU and/or another cell (e.g., another LAA WTRU and/or cell) may share a channel may be referred to as a "friendly" WTRU and/or cell. Friendly WTRUs may be WTRUs that may belong to a same eNodeB and/or cell (e.g., an LAA cell and/or a PCell). A WTRU belonging to an eNodeB may be a friendly WTRU to one or more cells of that eNodeB. A friendly cell to a WTRU may be a WTRU's serving an LAA cell. The terms "friendly WTRU," "friendly cell,", "interference friendly WTRU," "interference friendly cell," "LAA interference friendly WTRU," and "LAA interference friendly cell" may be used interchangeably herein. Also as used herein, the term "friendly" may be used interchangeably with the terms "non-adverse", "cooperative", and/or "compatible."

Techniques may be provided to enable a first LAA WTRU to determine that a channel may be in use by a friendly LAA WTRU or a friendly LAA cell. This may enable the first LAA WTRU to share the channel with the friendly LAA WTRU and/or cell.

Techniques may be provided to enable an LAA cell to determine that a channel is being used by a friendly WTRU (e.g., a WTRU of the LAA cell) and/or a friendly cell (e.g., a cell with which it may be communicating and/or coordinating, for example, over an X2 interface).

A transmission of a first WTRU and/or LAA cell on a channel may include a signal and/or an idle component that may be used by a second WTRU and/or LAA cell to determine that the first WTRU and/or LAA cell is a friendly WTRU and/or LAA cell. This signal may be referred to as a "friendly user signal."

A WTRU and/or cell may perform CCA, for example in a CCA occasion. The CCA may include a measurement that may be an energy detection measurement. Perhaps for example if CCA succeeds (e.g., if the measurement is below a threshold), the WTRU and/or cell may transmit in the associated subframe and/or subframes. Perhaps for example if the CCA fails (e.g., if the measurement is at or above a threshold), the WTRU and/or cell may determine whether the channel may be busy due to transmission by a friendly WTRU and/or cell. Perhaps for example if the WTRU and/or cell determines that the channel may be busy due to transmission by a friendly WTRU and/or cell, the WTRU and/or cell may transmit in the subframe and/or subframes associated with the CCA occasion.

A WTRU and/or cell may perform CCA, for example in a CCA occasion. The CCA may include a measurement that may be an energy detection measurement. Perhaps for example if a CCA succeeds (e.g., if the measurement is below a first threshold), the WTRU and/or cell may transmit in the associated subframe and/or subframes. Perhaps for example f the CCA fails (e.g., if the measurement is at or above a the first threshold), but the measurement is below a second threshold, the WTRU and/or cell may determine whether the channel may be busy due to transmission by a friendly WTRU and/or cell. Perhaps for example if the WTRU and/or cell determines that the channel may be busy due to transmission by a friendly WTRU and/or cell, the WTRU and/or cell may transmit in the subframe and/or subframes associated with the CCA occasion. Perhaps for example if the measurement is above the second threshold, or above the first and second thresholds, the WTRU and/or cell may consider this a CCA fail.

A WTRU and/or cell may attempt to detect a friendly signal and/or idle component to determine whether a channel may be busy due to transmission by a friendly WTRU and/or cell. Perhaps for example if the WTRU detects a friendly signal and/or idle component, the WTRU may determine that the channel may be busy due to transmission by a friendly WTRU and/or cell.

A WTRU and/or cell may attempt to detect a friendly signal and/or idle component perhaps for example if the measurement is above a first threshold and below a second threshold.

A WTRU and/or cell might not attempt to detect a friendly signal and/or idle component perhaps for example if the measurement is above a second threshold, or above a first and second thresholds. The second threshold may or might not be higher than the first threshold.

A friendly WTRU and/or cell may be replaced by another WTRU and/or cell. A WTRU and/or cell may use one or more of the techniques described herein to, for example, determine whether a channel may be busy and/or unavailable due to transmission by an LAA WTRU and/or cell (e.g., an LTE WTRU and/or cell operating on the channel that may be unlicensed).

A WTRU and/or cell may determine that a channel may be busy due to the transmission by a friendly WTRU and/or cell based on a presence of a friendly signal and/or idle component (e.g., WTRU and/or cell detection of such a presence).

A friendly signal may be a known and/or configured signal that may occupy a known, determined, and/or configured set of time and/or frequency resources, for example within a subframe.

A friendly signal may be a reference signal sequence transmitted in a known time and/or frequency location. A reference signal sequence may be transmitted in a center N physical resource blocks (PRBs) (e.g., N=6) and/or in at least one symbol of such PRBs. The reference signal may be transmitted in one or more resource elements (REs) of one or more PRBs. A same reference signal sequence may be transmitted for uplink and/or downlink transmission. For example, a particular OFDM symbol in a downlink subframe and/or a particular SC-FDMA symbol in an uplink subframe may contain a reference signal sequence. For example, a particular OFDM symbol may be a last OFDM symbol in subframe. In another example, a particular SC-FDMA symbol may be a last and/or a second to last SC-FDMA symbol in an uplink subframe. Transmission may be in at least part of the symbol. A reference signal sequence may be determined as a function of a cell-ID. A cell-ID may be a physical cell-ID, a global cell-ID, and/or a virtual cell-ID that may be configured via broadcast, a broadcasting channel, and/or a dedicated higher layer signaling. A friendly signal may be a known signal superpositioned with a downlink and/or an uplink signal. A cell and/or a WTRU may perform auto-correlation to detect a known signal on order to determine a friend signal.

An idle component may be a portion (e.g., a set of time and/or frequency resources) of a subframe during which no transmission may be made. The time and/or frequency resources of an idle component may be configured, determined, and/or known. For example, an eNodeB may identify resources for an idle component in an UL grant to a WTRU. An idle component may be a null signal in which a signal energy may be below a certain threshold. A null signal may be located in one or more resource elements, PRB-pairs, and/or OFDM/SC-FDMA symbols in a subframe. The terms "idle component," "null signal," and "null resource element" may be used interchangeably herein.

A WTRU that transmits in the UL according to a grant might not transmit in time and/or frequency resources indicated for an idle component. A WTRU that may determine whether a channel may be used by a friendly WTRU and/or cell may measure (e.g., associated energy) in designated time and/or frequency resources (e.g., resources designated in its grant). Perhaps for example, if the measured energy is below a threshold (e.g., because a friendly WTRU and/or cell may be transmitting and/or knows not to transmit in those resources), the WTRU and/or cell may determine that a user of the channel is friendly and/or may transmit according to its received grant.

An idle component may be located in a center N PRBs (e.g., N=6) and/or in one or more symbols of such PRBs.

An idle component location in time and/or frequency may be determined as a function of a cell ID. A cell ID may be a physical cell ID, a global cell ID, and/or a virtual cell ID that may be configured via broadcast, a broadcast channel, and/or dedicated higher layer signaling.

Time and/or frequency location (e.g., of an idle component and/or a friendly signal) may include and/or correspond to a set of PRBs and/or a block of symbols in time and/or subcarriers in frequency (e.g., in a subframe and/or set of subframes).

As used herein, the terms "location" and "resource" may be used interchangeably. "Time/frequency" may be used to represent time and/or frequency.

CCA occasions that may be configured and/or used for determination of channel availability for UL transmission may be WTRU-specific and/or cell-specific. Cell-specific CCA occasions may enable WTRUs of a cell to perform CCA at a same time, which may result in the WTRUs experiencing the same interference, for example if there are no hidden nodes.

Perhaps for example if WTRU-specific CCA occasions are used, and/or there may be a gap between a CCA occasion and the UL transmission, a WTRU that acquires a channel may transmit a reservation signal and/or may prevent another WTRU in the same cell with a later CCA occasion from seeing the channel free when it performs CCA.

A reservation signal transmitted by a WTRU in a cell (and/or by the cell) may enable a friendly WTRU and/or cell to acquire a channel (and/or determine that a channel is in use by an LAA WTRU and/or cell that may be friendly). For example, detection of a reservation signal might not prevent a friendly WTRU and/or cell from transmitting on a channel.

A reservation signal might not be transmitted during a CCA occasion, for example during a time window when CCA may be performed in a cell.

A reservation signal may include an idle component during which no signal may be transmitted. Such an idle component may be configured and/or determined. Perhaps for example, if a WTRU and/or a cell determines that a channel may be busy (e.g., based on a measurement such as an energy detect measurement) and/or measures above a threshold, the WTRU and/or cell may check for an idle component and/or, if an idle component is detected, may determine that the transmission may be from a friendly user of the channel. Perhaps for example if the channel is determined to be occupied by a friendly user, a WTRU and/or cell may transmit as scheduled and/or planned. A WTRU may use a second (perhaps for example, higher) threshold to determine whether the WTRU may transmit perhaps for example if it determines that the channel may be occupied by a friendly user.

A reservation signal may be orthogonal in frequency to the CCA occasions. CCA occasions may be defined in time as well as frequency.

A reservation signal may use a signature that is identifiable by other WTRUs to separate the reservation signal interference from actual channel interference during the CCA.

Signal characteristic detection may be used to detect transmission by a friendly WTRU and/or cell. A WTRU may detect and/or determine, for example in a CCA occasion, that a signal (e.g., a signal transmitted on an unlicensed channel) may be from a friendly WTRU and/or cell based on an LAA channel characteristic, for example without using a friendly signal and/or an idle component to make such a determination.

A WTRU and/or a cell that performs CCA may detect a known signal transmitted repetitively. For example, a WTRU and/or a cell may use signal characteristics of an OFDM symbol for a downlink and/or an SC-FDMA symbol for an uplink to determine whether the detected signal is from a friendly WTRU and/or cell.

A cyclic prefix (CP) may be used for one or more, or each OFDM symbol in a downlink subframe and/or for one or more, or each SC-FDMA symbol in an uplink subframe. Such a cyclic prefix may be a copy of a last part of an OFDM symbol and/or an SC-FDMA symbol and/or may be transmitted at a beginning of an OFDM symbol and/or a SC-FDMA symbol. A WTRU and/or a cell may perform autocorrelation of the CP and/or the corresponding part of the OFDM symbol and/or SC-FDMA symbol to determine whether a signal on a channel (e.g., an LAA, an unlicensed channel, and/or any other channel) may be an LAA and/or LTE signal.

A CCA occasion may be a window of time during which a WTRU and/or a cell may perform CCA, for example to determine whether a channel may be busy. A CCA occasion duration may be an amount of time and/or a minimum amount of time prior to transmission during which a WTRU and/or cell may monitor and/or measure a channel to determine its status. For example, a CCA occasion may be n microseconds before transmission may occur, and/or may be of n microseconds duration. A CCA occasion duration may be predefined and/or may be configured via a broadcast and/or a higher layer signaling. A CCA occasion duration may be determined as a function of one or more system parameters, which may include CP length, physical cell-ID, and/or TDD subframe configuration. A CCA occasion duration may be determined as an OFDM and/or an SC-FDMA symbol length with CP length. A CCA occasion duration may be N OFDM symbols and/or N SC-FDMA symbols.

LAA channel sharing may be configured, activated, initiated, and/or used. LAA channel sharing may be a mode of operation. The terms "LAA channel sharing" and "LAA channel sharing mode" may be used interchangeably herein.

A WTRU may be configured with or configured to use LAA channel sharing. Such a configuration may be provided by an eNodeB, for example via broadcast and/or higher layer signaling. Such broadcast and/or higher layer signaling may be transmitted via a PCell (e.g., a PCell associated with an LAA cell) and/or may be received by a WTRU.

Perhaps for example if a WTRU is configured to use and/or perform LAA channel sharing and/or a measurement in a particular CCA occasion is above a threshold, such a WTRU may determine to transmit a signal in the subframe associated with the particular CCA occasion based on satisfying one or more conditions related to channel sharing. For example, a condition may be detection of a presence of an idle component, detection of a friendly signal, and/or detection of an LTE and/or LAA signal characteristic in a signal on the channel. Another condition may be determining that the signal is below a second threshold.

Perhaps for example if a WTRU is not configured to use and/or perform LAA channel sharing and/or a measurement in a certain CCA occasion is above a threshold, the WTRU may determine not to transmit a signal in the subframe associated with the CCA occasion.

A mode of operation supporting LAA channel sharing may be referred to as "LAA shared mode" and/or a mode of operation not supporting LAA channel sharing may be referred to as "LAA individual mode." LAA shared mode (or LAA channel sharing) may be supported. Perhaps for example without any indication, a WTRU may be configured for LAA shared mode.

A mode of operation (and/or configuration and/or use of LAA channel sharing) may be indicated from broadcasting and/or higher layer signaling.

A mode of operation (and/or configuration and/or use of LAA channel sharing) may be configured individually for one or more, or each LAA channel. For example, two or more LAA cells (e.g., SCells) may be configured and/or a mode of operation (and/or configuration and/or use of LAA channel sharing) may be configured per LAA cell.

A CCA occasion duration may vary according to a mode of operation (e.g., LAA channel sharing or not). A CCA occasion duration may be determined based on a mode of operation (e.g., use and/or configuration for LAA channel sharing or not). For example, in LAA shared mode, a CCA occasion duration may be x (e.g., x μs) while a CCA occasion duration may be y (e.g., y μs) for LAA individual mode. For example, x may be longer than y. For example. x may be one or more of an OFDM symbol length of an LAA channel.

Figure 9:
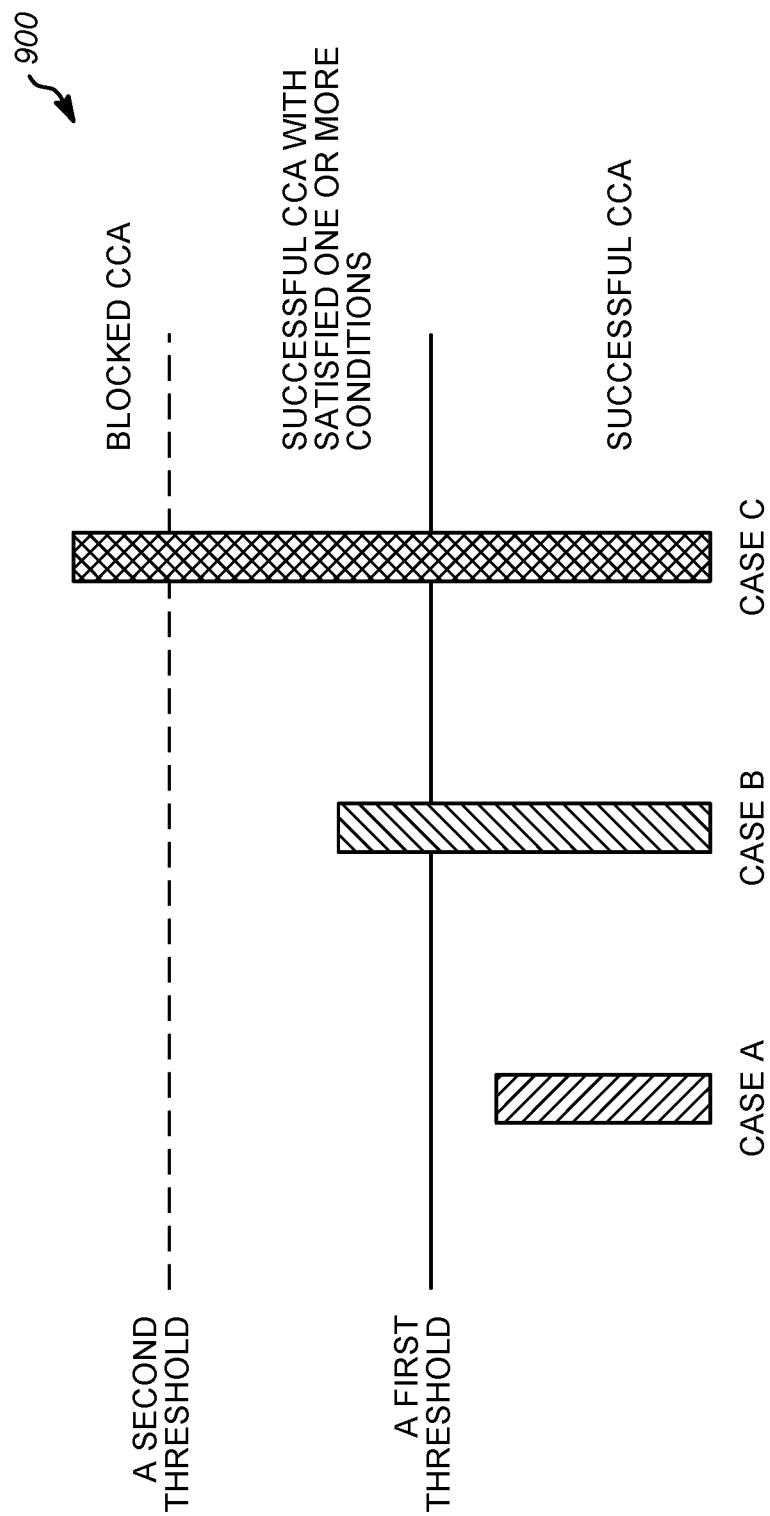
FIG. 9 is a diagram illustrating example measurement cases and/or determinations of blocked clear channel assessment and/or successful clear channel assessment using thresholds.

A threshold value used to determine a CCA fail and/or a CCA success may be different according to a mode of operation (e.g., LAA channel sharing or not). A single threshold may be used for LAA individual mode and/or, perhaps for example if a measurement in a CCA occasion is above such a threshold, a WTRU may determine CCA fails for the CCA occasion. Two or more thresholds may be used for LAA shared mode. One of such thresholds may be the same as the threshold used for the LAA individual mode.

Where two thresholds are used, a first threshold and/or a second threshold may be configured and/or predefined and/or the first threshold may be lower than the second threshold, as illustrated in diagram 900 of FIG. 9. The first threshold may be the same as the threshold used for the LAA individual mode. The determination of the blocked CCA and/or successful CCA may be based on the measurement result cases. For example, case A may be associated with the case where there are consistently successful CCAs. Case C may be associated with the case where there are consistently blocked CCAs. Case B may be associated with the case where there may be a blocked CCA and/or a successful CCA based on one or more conditions that may include the conditions of having a blocked CCA perhaps for example if an LAA individual mode is configured and/or a successful CCA perhaps for example if a measured signal is from a friendly WTRU and/or cell and the WTRU is configured with the LAA shared mode.

Two or more CCA types may be used in one or more particular CCA occasions. A first CCA type may be used for detection of a first type of signal and/or a second CCA type may be used for detection of a second type of signal. One or more, or each of the first type of signal and/or the second type signal may include, but is not limited to, a signal from a friendly WTRU or cell, an energy level of a signal, a measurement used for a threshold, a measurement based on a friendly signal, a measurement from an idle component, a known sequence in a known time and/or frequency resource, a repetitive signal (e.g., a CP), an OFDM symbol length and/or an SC-FDMA symbol length, and/or a waveform used by a friendly WTRU and/or cell.

Figure 10:
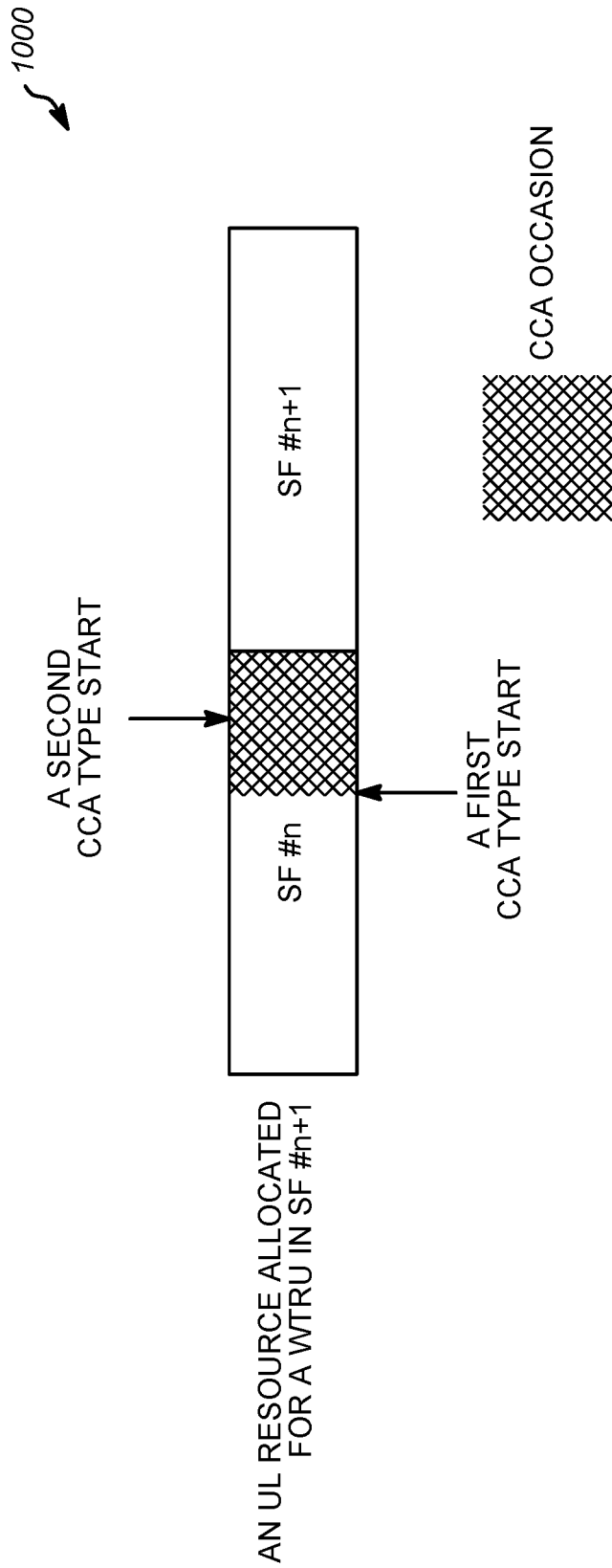
FIG. 10 is a diagram illustrating an example determination of a clear channel assessment start timing.

Two or more CCA types may be used in a CCA occasion and/or a starting time of a CCA in a CCA occasion may vary according to CCA type, an example of which is illustrated in diagram 1000 of FIG. 10.

Note that, as used herein, "blocked" and "failed" may be used interchangeably. A first CCA type may be used for a measurement (e.g., an energy level detection) while a second CCA type may be used for detecting a signal from a friendly WTRU and/or cell. A blocked and/or successful CCA may be determined per CCA type. For example, some techniques may use a blocked and/or successful first type of CCA and/or a blocked and/or successful second type of CCA.

Perhaps for example if a WTRU determines a blocked first type of CCA, the WTRU may transmit a signal in a subframe associated with the CCA occasion if the second type CCA is successful (e.g., successful second type CCA). The WTRU might not transmit a signal in the subframe associated with the CCA occasion perhaps for example if the WTRU is configured with LAA individual mode, and/or the second type of CCA may be used perhaps for example if the first type of CCA is determined to be a blocked CCA. Perhaps for example if a WTRU determines a successful first type of CCA, the WTRU may transmit a signal in the subframe associated with the CCA occasion regardless of the second type CCA status.

A number of CCA types used in a CCA occasion may be determined based on a mode of operation. For example, a single CCA type may be used in LAA individual mode and/or two or more CCA types may be used in LAA shared mode. A CCA occasion duration may be determined based on a CCA type having a longest time within the CCA types used in a CCA occasion. A CCA occasion duration may be predefined and/or indicated via broadcast signaling.

Two or more CCA types may be used and/or one or more, or each CCA type may be associated with a threshold. Such a threshold may vary according the CCA type. Such a threshold may be determined as a function of the CCA type.

An eNodeB may determine that a transmission on a cell is a UL transmission that the eNodeB granted using a friendly signal and/or idle component in the transmission. Perhaps for example if the eNodeB determines that the channel is busy and/or detects the presence of an idle component, the eNodeB may determine that a WTRU for which it granted permission to transmit in the UL is transmitting in the UL. The eNodeB may make this determination prior to decoding and/or attempting to decode a transmission on the channel. The eNodeB may use this detection to determine whether the transmission is a bad transmission or no transmission.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
   receiving downlink control information (DCI), the DCI comprising:
      an indication of an uplink (UL) grant for an UL transmission, the UL grant indicating one or more subframes; and
      an indication of one or more parameters associated with a Clear Channel Assessment (CCA) occasion, the CCA occasion corresponding to a time period to conduct one or more CCAs, at least one of the one or more parameters associated with a duration of the CCA occasion;
   determining a start time of the UL transmission for a first subframe of the one or more subframes based at least on the UL grant;
   determining a start time of the CCA occasion based at least on the start time of the UL transmission and the duration of the CCA occasion, wherein the CCA occasion is before the start time of the UL transmission and the duration of the CCA occasion is based at least in part on the at least one of the one or more parameters associated with the duration of the CCA occasion;
   performing the one or more CCAs on a channel during the CCA occasion;
   determining whether the channel is available based on the one or more CCAs; and
   sending the UL transmission at the start time of the UL transmission via the channel on a condition that the channel is determined to be available.

2. The method of claim 1, wherein the channel is an unlicensed channel.

3. The method of claim 1,
   wherein receiving the DCI comprises receiving an indication of at least a start of a block of UL subframes and a length of the block of UL subframes.

4. The method of claim 3, wherein identifying the CCA occasion further comprises identifying the CCA occasion based at least in part on whether the UL transmission is within the block of UL subframes.

5. The method of claim 1, wherein the UL grant further indicates a time allocation of a range of the one or more subframes and a duration of the time allocation.

6. The method of claim 1, wherein the DCI is received from a network entity, the network entity being at least one of: an evolved NodeB (eNB) or a cell.

7. The method of claim 3, wherein receiving the indication of at least the start of the block of UL subframes and the length of the block of UL subframes comprises receiving a group DCI, the method further comprising:
   decoding the group DCI with a Radio Network Temporary Identifier (RNTI) corresponding to the group DCI.

8. A wireless transmit/receive unit (WTRU), the WTRU comprising:
   a memory;
   a receiver, the receiver configured at least to receive downlink control information (DCI), the DCI comprising:
      an indication of an uplink (UL) grant for an UL transmission, the UL grant indicating one or more subframes; and
      an indication of one or more parameters associated with a Clear Channel Assessment (CCA) occasion, the CCA occasion corresponding to a time period to conduct one or more CCAs, at least one of the one or more parameters associated with a duration of the CCA occasion; and
   a processor, the processor configured at least to:
      determine a start time of the UL transmission for a first subframe of the one or more subframes based at least on the UL grant;
      determine a start time of the CCA occasion based at least on the start time of the UL transmission and the duration of the CCA occasion, wherein the CCA occasion is before the start time of the UL transmission and the duration of the CCA occasion is based at least in part on the at least one of the one or more parameters associated with the duration of the CCA occasion;
      perform the one or more CCAs on a channel during the CCA occasion;
      determine whether the channel is available based on the one or more CCAs; and
      send the UL transmission at the start time of the UL transmission via the channel on a condition that the channel is determined to be available.

9. The WTRU of claim 8, wherein the channel is an unlicensed channel.

10. The WTRU of claim 8, wherein the DCI comprises an indication of at least a start of a block of UL subframes and a length of the block of UL subframes.

11. The WTRU of claim 10, wherein the processor is further configured to identify the CCA occasion based at least in part on whether the UL transmission is within the block of UL subframes.

12. The WTRU of claim 8, wherein the receiver is further configured to receive the DCI from a network entity, the network entity being at least one of: an evolved NodeB (eNB) or a cell.

13. The WTRU of claim 10, wherein the DCI comprising the indication of at least the start of the block of UL subframes and the length of the block of UL subframes is received via a group DCI, the processor being further configured to:
   decode the group DCI with a Radio Network Temporary Identifier (RNTI) corresponding to the group DCI.

14. The WTRU of claim 8, wherein the UL grant further indicates a time allocation of a range of the one or more subframes and a duration of the time allocation.

* * * * *